US010179300B2

(12) United States Patent
Cox et al.

(10) Patent No.: US 10,179,300 B2
(45) Date of Patent: Jan. 15, 2019

(54) SEPARATOR ASSEMBLY AND METHOD

(71) Applicant: Separation Solutions, L.L.C., Oklahoma City, OK (US)

(72) Inventors: Larry W. Cox, Oklahoma City, OK (US); James Redd, Elk City, OK (US); Michael Cox, Oklahoma City, OK (US)

(73) Assignee: Separation Solutions, LLC, Oklahoma City, OK (US)

( * ) Notice: Subject to any disclaimer, the term of this patent is extended or adjusted under 35 U.S.C. 154(b) by 0 days.

(21) Appl. No.: 15/357,116

(22) Filed: Nov. 21, 2016

(65) Prior Publication Data

US 2017/0144085 A1 May 25, 2017

Related U.S. Application Data

(60) Provisional application No. 62/257,874, filed on Nov. 20, 2015.

(51) Int. Cl.
*B01D 17/028* (2006.01)
*C02F 1/40* (2006.01)
*B01D 17/02* (2006.01)
*C02F 101/32* (2006.01)
*C02F 103/10* (2006.01)

(52) U.S. Cl.
CPC ............ *B01D 17/0211* (2013.01); *C02F 1/40* (2013.01); *C02F 2101/32* (2013.01); *C02F 2103/10* (2013.01)

(58) Field of Classification Search
CPC .... B01D 17/0211; B01D 17/0214; C02F 1/40

USPC ...................... 210/521, 539, 540, 802; 52/22
See application file for complete search history.

(56) References Cited

U.S. PATENT DOCUMENTS

| | | | | |
|---|---|---|---|---|
| 2,083,861 A * | 6/1937 | Padgett | ............. | B01D 17/0211 210/536 |
| 2,826,306 A * | 3/1958 | Burns | ................ | B01D 17/0214 210/539 |
| 4,228,729 A * | 10/1980 | Messick | .................. | E04D 13/17 52/22 |
| 5,028,333 A * | 7/1991 | Wright | ............... | B01D 17/0211 210/521 |
| 5,266,119 A | 11/1993 | Greene et al. | | |
| 5,389,249 A * | 2/1995 | Richards | ............ | B01D 21/0003 210/539 |
| 5,433,845 A | 7/1995 | Greene et al. | | |
| 5,520,825 A * | 5/1996 | Rice | .................... | B01D 17/0211 210/521 |

(Continued)

OTHER PUBLICATIONS

International Search Report and Written Opinion (PCT/US2016/063070); dated Mar. 9, 2017.

*Primary Examiner* — Christopher Upton
(74) *Attorney, Agent, or Firm* — Dunlap Codding, P.C.

(57) ABSTRACT

A separator assembly has a tank and a lid removably attached to a top side of the tank so as to create a gas tight seal with the top side of the tank. The tank has an influent chamber, a separator chamber, an oil chamber, and an effluent chamber in fluid communication with one another. A pipe extends from the separator channel to the effluent chamber allowing the passage of water from the separator chamber to effluent chamber. A plurality of vertical plates are positioned in the separator chamber to define a serpentine path from the influent chamber to the oil chamber.

18 Claims, 20 Drawing Sheets

(56) References Cited

U.S. PATENT DOCUMENTS

| | | | |
|---|---|---|---|
| 5,799,812 A * | 9/1998 | Mansouri | B65D 77/0466 220/4.31 |
| 6,029,839 A * | 2/2000 | Mansouri | B65D 77/061 220/4.31 |
| 7,572,382 B2 | 8/2009 | Mesher et al. | |
| 7,771,588 B2 | 8/2010 | Engel et al. | |
| 2001/0027954 A1 * | 10/2001 | Broeders | B01D 17/0214 210/521 |
| 2008/0272061 A1 | 11/2008 | Hart et al. | |
| 2009/0014392 A1 * | 1/2009 | McEwen | B01D 17/0211 210/801 |
| 2009/0184049 A1 * | 7/2009 | Murray | B01D 17/0211 210/521 |
| 2013/0087511 A1 | 4/2013 | Ledebuhr et al. | |
| 2014/0332451 A1 | 11/2014 | Munisteri | |

* cited by examiner

SEPARATOR ASSEMBLY AND METHOD

CROSS-REFERENCE TO RELATED APPLICATION

This application claims priority to U.S. Provisional Application Ser. No. 62/257,874, filed on Nov. 20, 2015, the entirety of which is hereby expressly incorporated herein by reference.

BACKGROUND

Oil and gas production operations throughout the United States and all over the world increasingly rely on hydraulic fracturing as a completion process to stimulate production from formations. Hydraulic fracturing involves high-pressure injection of large quantities of water, along with sand and other small amounts of chemical additives, into a well. The high-pressure water creates small fractures, or cracks, in the surrounding rock formation, and sand or other proppant used wedges into the cracks and prevents them from closing up once the water pressure is removed. These cracks allow any oil and gas entrapped in the formation to escape and be recovered at the wellhead, and ultimately sold to consumers.

Upon completion of a hydraulic fracturing process in a well, as a result of discontinuing the high-pressure water injection a large portion of the injected water (from several thousand to millions of gallons) is recovered at the wellhead as flowback water. Such flowback water typically contains liquid hydrocarbons, gases dissolved in the water due to the high-pressures in the well, other organic or non-organic components, and solids which may include the proppant injected in the well, as well as sand/sediment, drill cuttings, and soil, washed up by the flowback water.

The gases dissolved in the flowback water as a result of the high pressures created during the hydraulic injection are highly flammable and pose serious environmental hazards. Hazardous air pollutants (HAP or HAPs) typically dissolved in or mixed with the flowback water comprise greenhouse gases, volatile organic compounds (VOC or VOCs), such as nitrogen oxides ($NO_x$), methane ($CH_4$), nitrous oxide ($N_2O$), carbon dioxide ($CO_2$), and liquid hydrocarbons, such as formaldehyde, benzene, and chlorofluorocarbons (CFCs). VOCs are organic chemicals that have a high vapor pressure at ambient conditions, and are especially problematic due to their tendency to readily dissolve in, or mix with, flowback water at high pressures, and to also readily evaporate from flowback water at atmospheric pressures and ambient temperatures. Further, most VOCs are generally not immediately toxic, but instead have compounding long-term health effects on oilfield personnel and other persons and animals exposed to even low concentrations of VOCs for prolonged periods of times.

Due to the health and environmental hazards of HAPs and VOCs, strict environmental laws and regulations have been enacted on the state (e.g., California Air Resources Board), federal (e.g., EPA, OSHA), and international levels, to minimize the emissions of HAPs, and VOCs in particular, into the environment during oilfield and other industrial and agricultural operations.

Conventional flowback water handling practice has been to flow wellstream fluids (e.g., flowback water) through a gas production unit or into a direct-fired production separator for a three-phase separation of the sales gas, the condensate/oil, and the flowback water at sales gas pressure. Conventional gas production units operate at pressures between 100-1400 psig and typically dump the exiting flowback water directly into atmospheric storage tanks after the sales gas has been separated.

Several problems are inherent in this approach, including inadequate retention times in the production separator and the flashing off of gas at the condensate and flowback atmospheric tanks resulting from the large pressure drop (e.g. from about 1400 psig to atmospheric pressure). Flash gases vented at flowback water and condensate storage tanks pose severe dangers of fires/explosions and environmental hazards of substantial amounts of HAPs emissions including VOCs.

To this end, a need exists for a method and separator assembly for treating production fluids, including flowback fluid inherent in hydraulic fracturing operations without allowing substantial amounts of VOCs and HAPs to be emitted to the atmosphere. It is to such a method and separator assembly that the inventive concepts disclosed herein are directed.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION OF EXEMPLARY EMBODIMENTS

Figure 1:
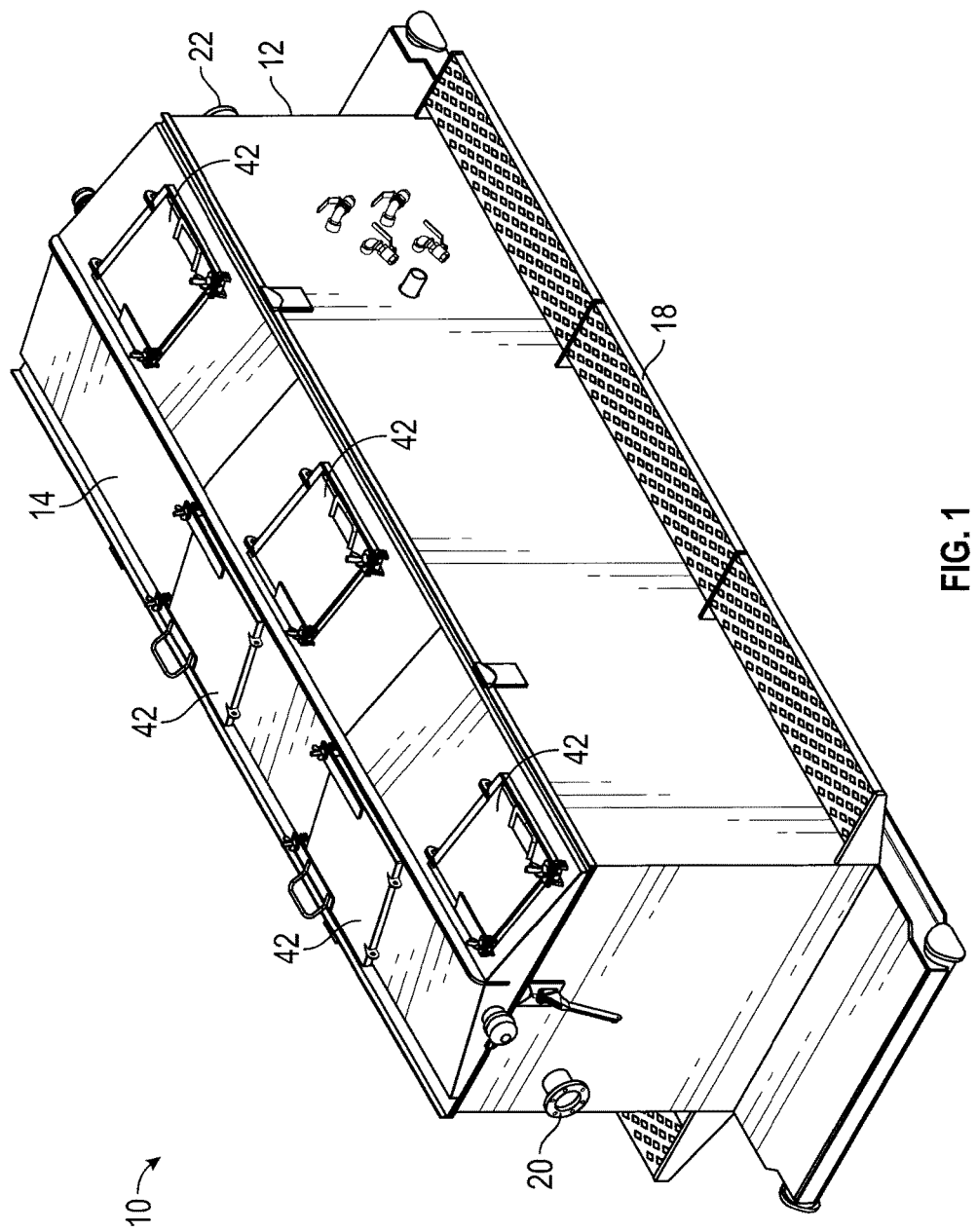
FIG. 1 is a perspective view of a separator assembly constructed in accordance with the inventive concepts disclosed herein.

Before explaining at least one embodiment of the presently disclosed and claimed inventive concepts in detail, it is to be understood that the presently disclosed and claimed inventive concepts are not limited in their application to the details of construction, experiments, exemplary data, and/or the arrangement of the components set forth in the following description or illustrated in the drawings. The presently disclosed and claimed inventive concepts are capable of other embodiments or of being practiced or carried out in various ways. Also, it is to be understood that the phraseology and terminology employed herein is for purpose of description and should not be regarded as limiting.

In the following detailed description of embodiments of the inventive concepts, numerous specific details are set forth in order to provide a more thorough understanding of the inventive concepts. However, it will be apparent to one of ordinary skill in the art that the inventive concepts disclosed and claimed herein may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a non-exclusive inclusion. For example, a process, method, article, or apparatus that comprises a list of elements or steps is not necessarily limited to only those elements or steps and may include other elements, steps, or features not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Throughout this disclosure and the claims, the terms "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, or combinations thereof, for example.

The use of the term "at least one" will be understood to include one as well as any quantity more than one, including but not limited to each of, 2, 3, 4, 5, 10, 15, 20, 30, 40, 50, 100, and all integers therebetween. The term "at least one" may extend up to 100 or 1000 or more, depending on the term to which it is attached; in addition, the quantities of 100/1000 are not to be considered limiting, as higher limits may also produce satisfactory results. Singular terms shall include pluralities and plural terms shall include the singular unless indicated otherwise.

The term "or combinations thereof" as used herein refers to all permutations and/or combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment, although the inventive concepts disclosed herein are intended to encompass all combinations and permutations including one or more of the features of the embodiments described herein.

Figure 3:
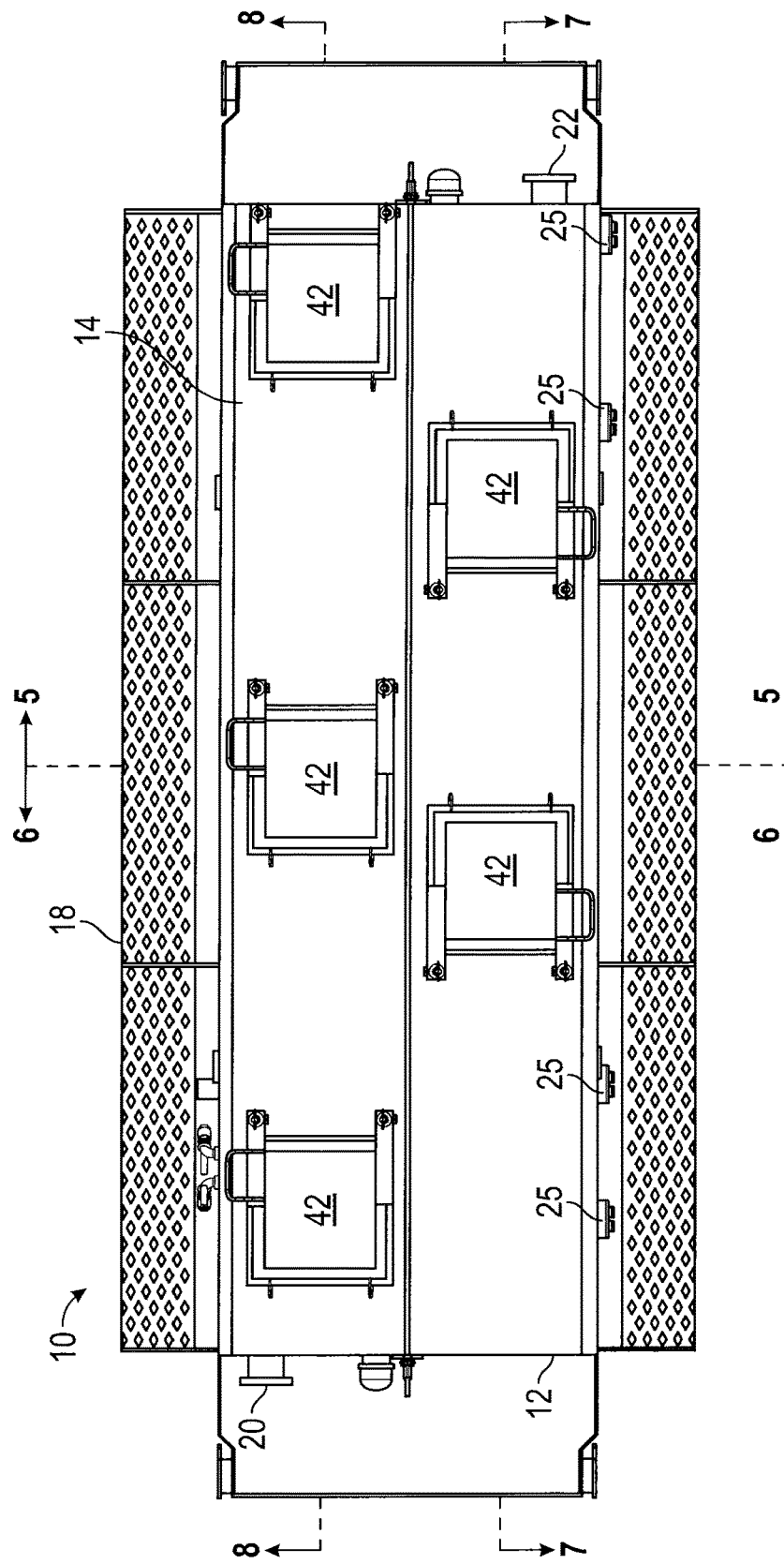
FIG. 3 is a top plan view of the separator assembly.

Referring now to the drawings, a separator assembly 10 constructed in accordance with the inventive concepts disclosed herein is illustrated. The separator assembly 10 is designed to remove particles of one immiscible liquid from another having a different density, such as, for example, for removing oil particles with a greater buoyancy (or, equivalently, a lighter density) than water from a slowly moving oil-water fluid mixture M and to capture separated gases. As shown in FIGS. 1 and 3, the separator assembly 10 broadly includes a tank 12, a lid 14 removably attached to the tank 12, and a skid 18 for supporting and facilitating access to the tank 12. The separator assembly 10 may be installed and operated in conjunction with a variety of other solids and fluids separation equipment.

Figure 2:
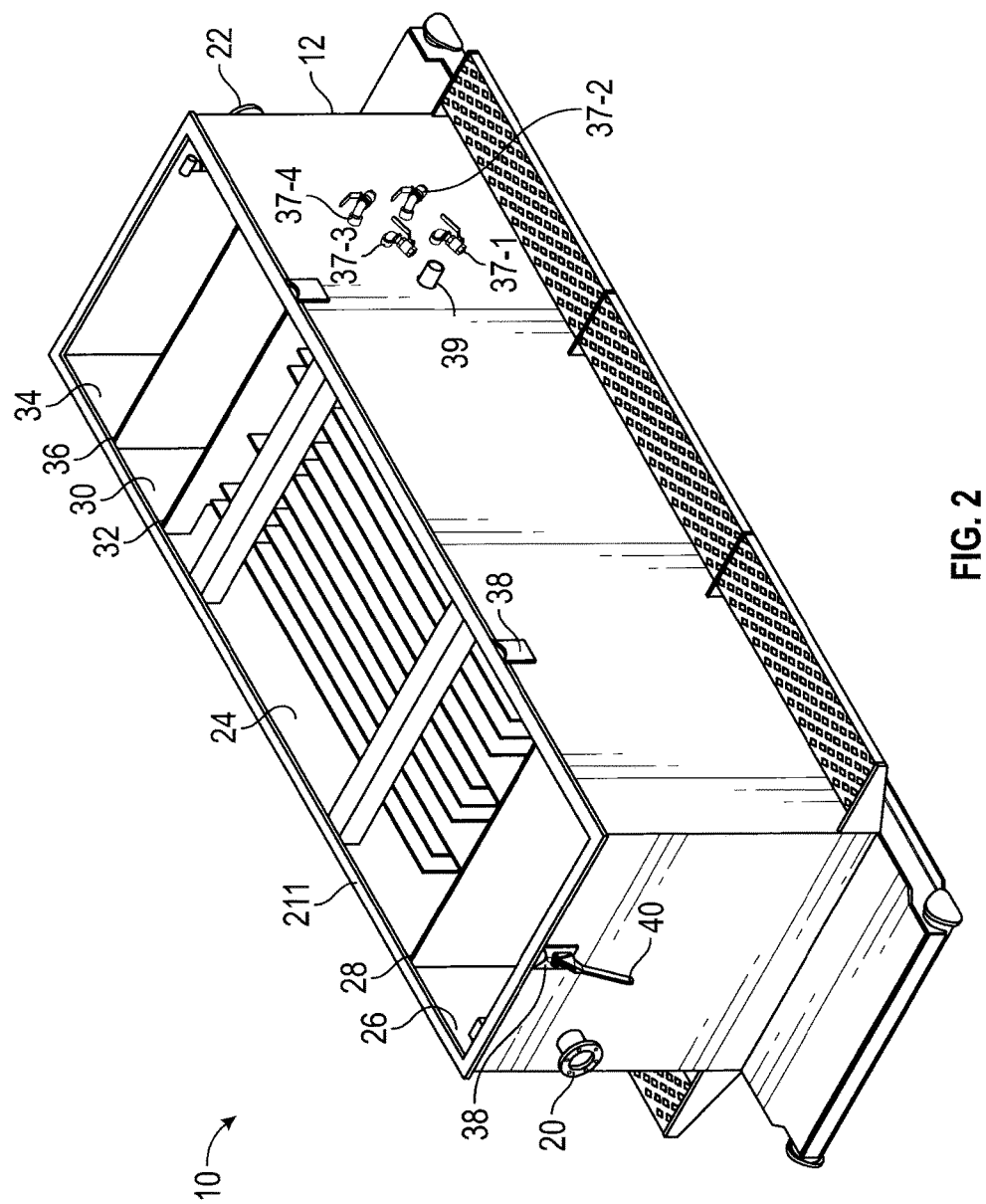
FIG. 2 is a perspective view of the separator assembly with a lid of the separator assembly removed therefrom.
Figure 4:
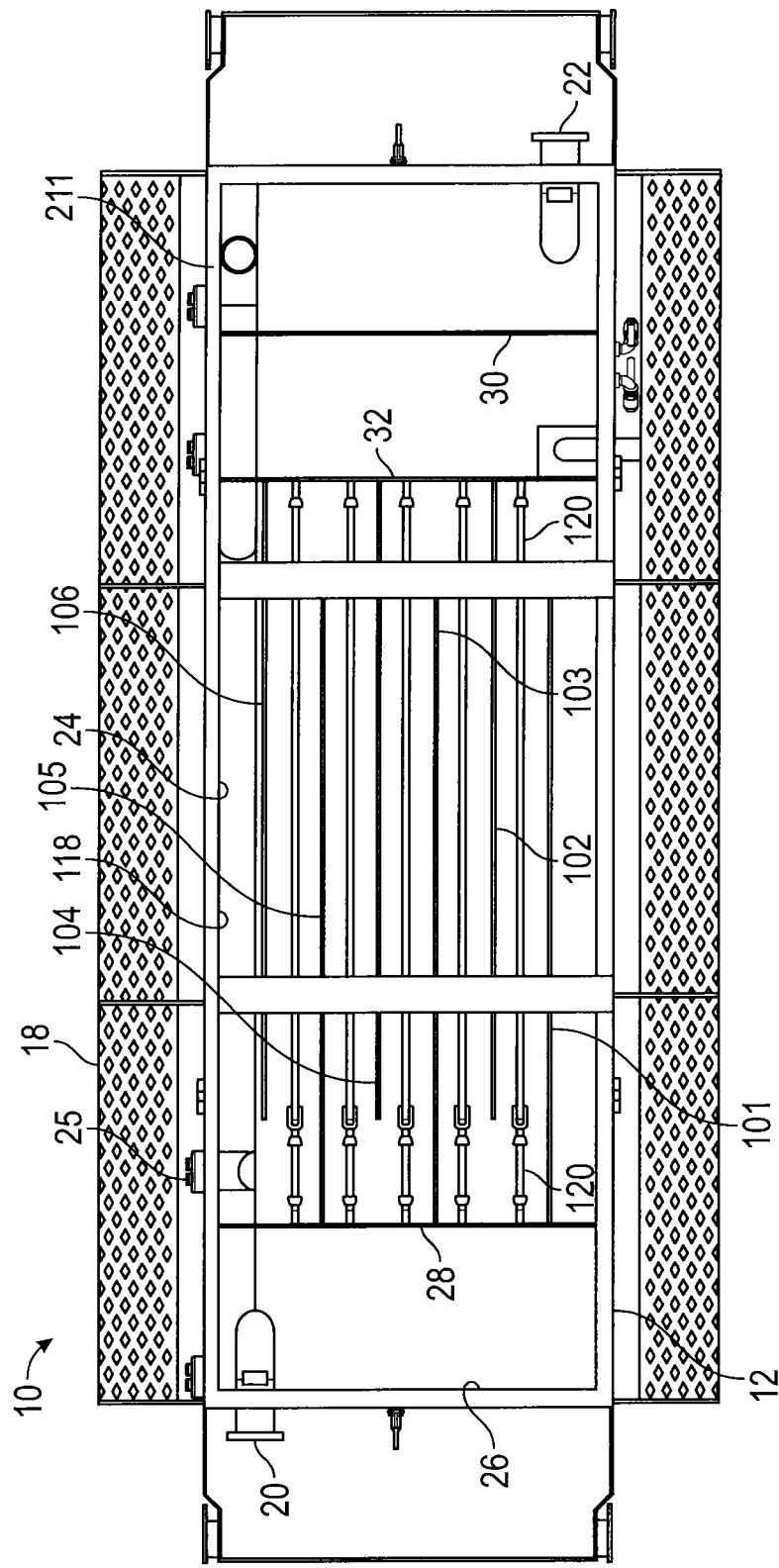
FIG. 4 is a top plan view of the separator assembly with the lid removed.

With reference to FIGS. 2 and 4, the tank 12 of separator assembly 10 includes an inlet 20 through which oil-water mixture M enters the separator assembly 10, an outlet 22 through which water exits the separator assembly 10, a separator chamber 24, an influent or sediment chamber 26 separated from separator chamber 24 by a first bulkhead or baffle 28 and interposed between separator chamber 24 and inlet 20, an oil holding or oil removal chamber 30 downstream of separator chamber 24 and separated from separator chamber 24 by a second bulkhead or baffle 32, and an effluent or discharge chamber 34 separated from oil removal chamber 30 by a third bulkhead or baffle 36 and interposed between oil removal chamber 30 and outlet 22. The separator chamber 24 has an opening 92 (FIG. 5) from the sediment chamber 26 causing the two chambers to be in fluid communication with one another. Likewise, oil removal chamber 30 has an opening or entrance 98 (FIG. 6) from the separator chamber 24 causing the two chambers to thereby be in fluid communication one with the other.

Figure 5:
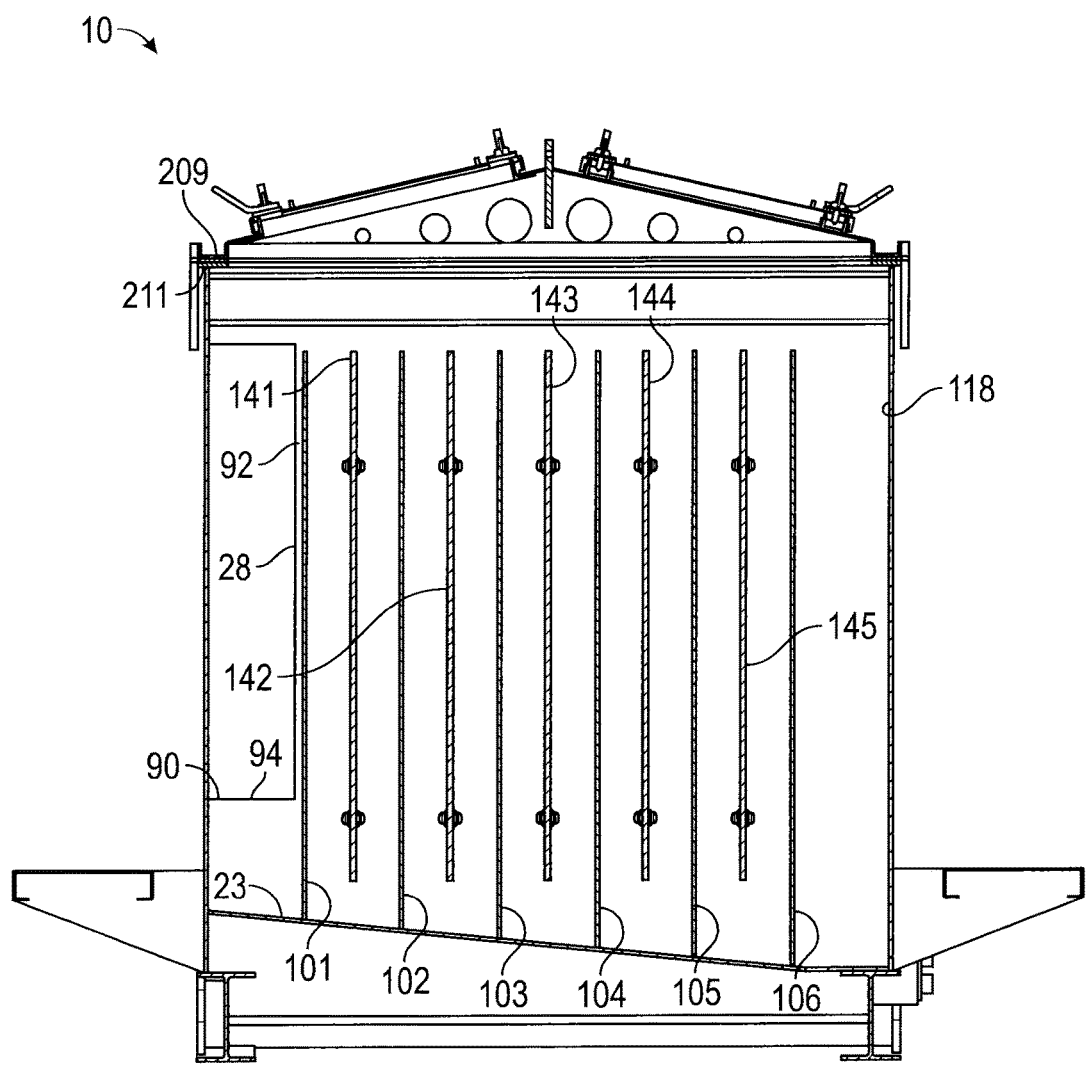
FIG. 5 is a cross sectional view taken along line 5-5 of FIG. 3.
Figure 6:
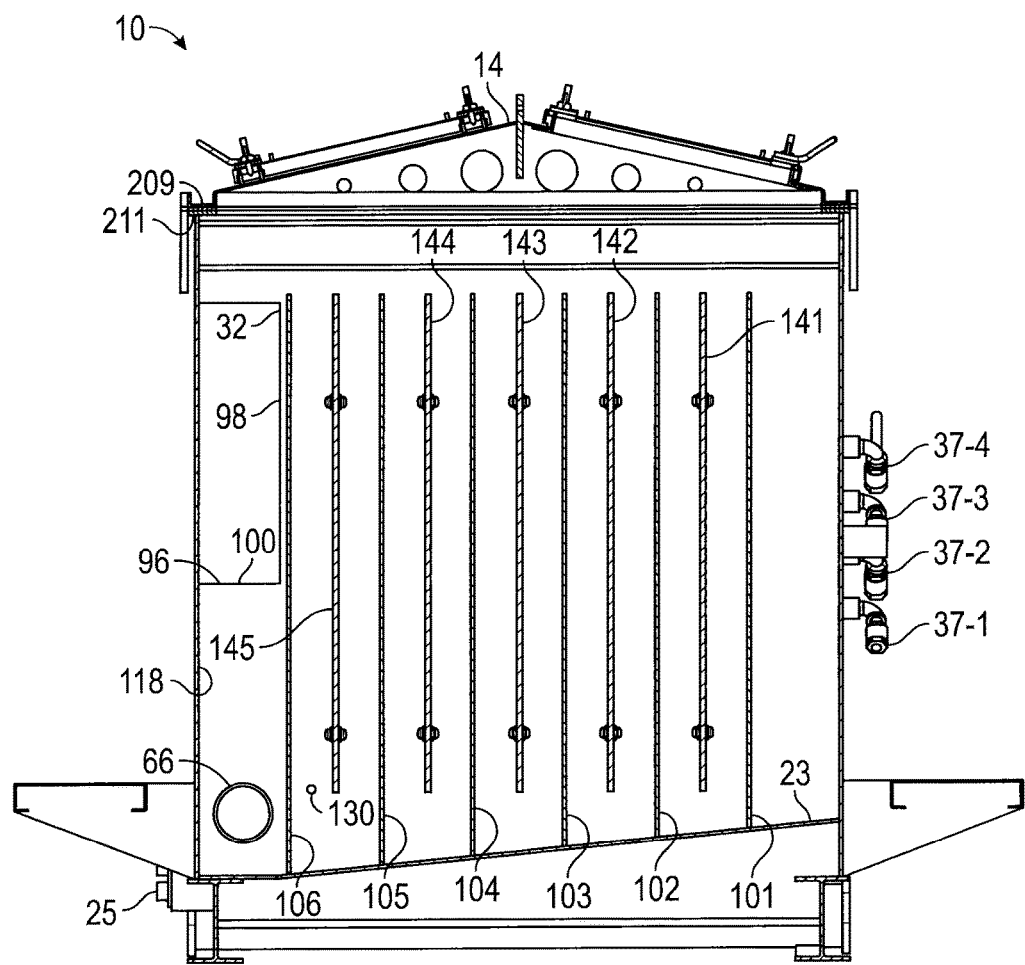
FIG. 6 is a cross sectional view taken along line 6-6 of FIG. 3

The tank 12 also includes one or more valves 37-1, 37-2, 37-3, and 37-4 for determining the level of liquid in the oil removal chamber 30, a port 39 for removing oil therefrom, a floor 23 which downwardly slopes (as best shown in FIGS. 5 and 6) from the back of tank 12 towards the front of tank 12 to aid in cleanout, and cleanout ports 25 located on the front of tank 12. To determine the height of liquid (e.g., the height of oil inside the oil removal chamber 30), the valves 37-1, 37-2, 37-3, and 37-4 are positioned in the oil removal chamber 30 at predetermined levels so that a sample of liquid may be taken at any one of the valves 37-1, 37-2, 37-3, and 37-4. In one embodiment, if oil is present at the level of the lowest valve 37-1, the liquid in the oil removal chamber 30 may be offloaded through port.

The tank 12 further includes a one or more V-blocks 38 for aligning the lid 14 on the tank 10 and one or more load binders 40 for securing the lid 10 to the tank 12. As will be described in further detail below, the lid 14 of the separator assembly 10 includes one or more access hatches or doors 42 and one more tabs 48 receivable by the V-blocks 38 for aligning the lid 14 on the tank 12. Access doors 42 may be in communication with, and provide access to, sediment chamber 26, separator chamber 24, and oil removal chamber 30.

Although the tank 12 is shown as being rectangular and constructed of metal, it should be appreciated that other shapes and sizes (e.g., cylindrical) and other materials, such as concrete or epoxy-glass fiber (fiberglass) or some combination thereof are equally suitable. For example, the tank 12 may include an inner coating made of an epoxy primer with a urethane finish. It should also be appreciated that, while oil and water are used as an example of two immiscible liquids of differing density for purposes of illustration herein, the present invention is applicable to other immiscible liquids of differing densities (buoyancies) as well.

For proper operation of the inventive concepts disclosed herein, the flow velocity of oil-water mixture M through separator assembly 10 may be controlled to be below a certain maximum value. To this end, the separator assembly 10 includes limiting means for constraining the flow of the oil-water mixture M to be below this certain maximum velocity. This limiting means may include both surge control means interposed between the separator chamber 24 and the outlet 22 for dampening fluctuations in the flow of the water out of the separator chamber 24 to the outlet 22 for increasing the time it takes for liquid to start exiting separator chamber 24 from the instant a surge of liquid enters separator chamber 24; as well as inlet flow rate control means at inlet 20 and interposed between the inlet 20 and the separator chamber 24 for relieving surges and constraining the volume flow rate of the oil-water fluid mixture M entering inlet 20.

Figure 7:
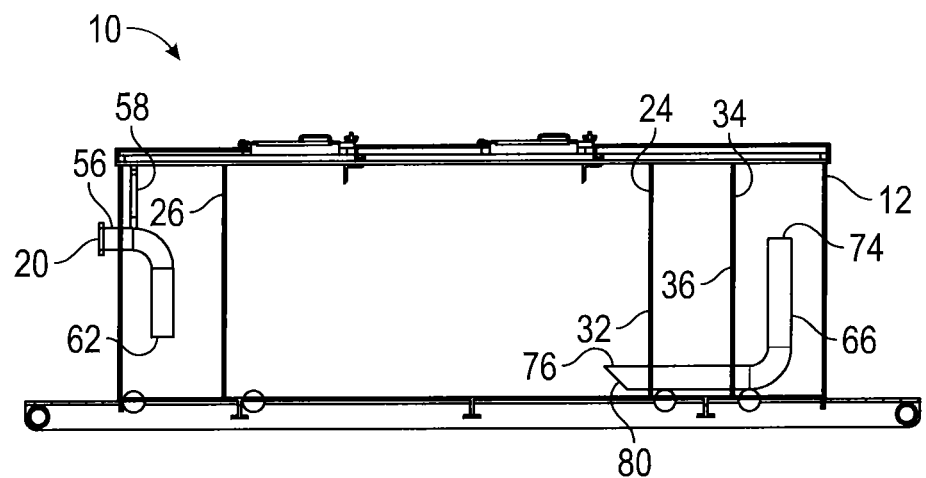
FIG. 7 is a cross sectional view taken along line 7-7 of FIG. 3.

Inlet flow rate control means includes an influent pipe 56 having an influent vent 58 extending to an upper portion of the tank 12. The vent 58 is positioned within the tank 12 to prevent vapor lock and to receive any fluid surges in a way that prevents spillage. It may be advisable that the fluid velocity in pipe 56 be less than some maximum velocity such as, for example, 4.25 feet per second, in order to prevent hydraulic jumps that often occur in open channel flows and to thereby reduce mixing and emulsification of the oil and water. This external constraint on separator assembly 10 is not part of the inventive concepts disclosed herein and can be met, in a manner well-known to those skilled in the art, by proper sizing of external pipe 56. As best shown in FIG. 7, the influent pipe 56 passes through the wall of tank 12 into sediment chamber 26 and terminates at an end 62 disposed toward the bottom of sediment chamber 26.

Figure 8:
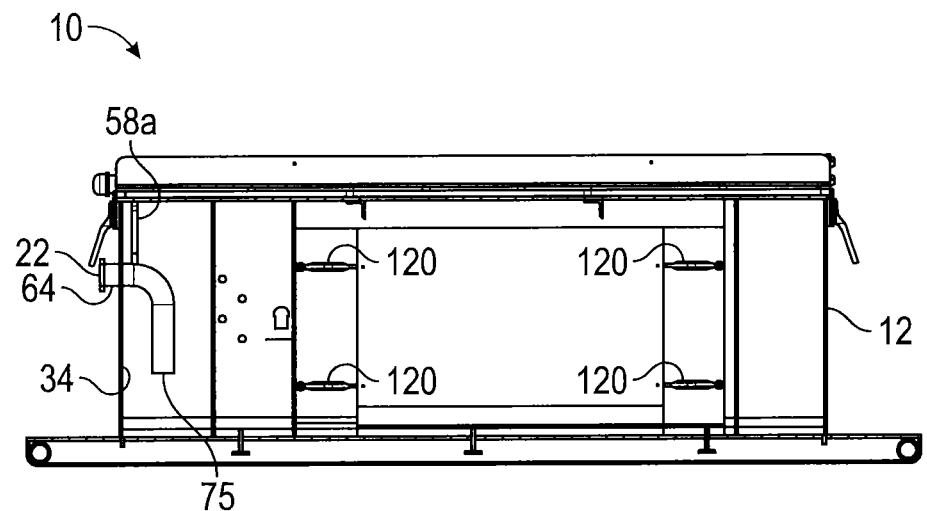
FIG. 8 is a cross sectional view taken along line 8-8 of FIG. 3.

Similarly, an effluent pipe 64 (FIG. 8) passes through the wall of tank 12 into discharge chamber 34 and terminates at an end 75 disposed toward the bottom of discharge chamber 34, thereby placing outlet 22 in communication therewith. In one embodiment, effluent pipe 64 passes through the wall of tank 12 at a height below that at which influent pipe 56 passes through the wall of tank 12 as shown. The effluent pipe 64 may be provided with a vent 58a extending upwardly from the effluent pipe 64 and positioned within the tank 12 to prevent vapor lock.

The liquid level within the sediment chamber 26 is defined to be a height H1 above the bottom of tank 12. Additionally, the liquid level within discharge chamber 34 is defined to be a height H2 above the bottom of tank 12. As oil accumulates on the surface of the oil-water mixture within separator chamber 24 and sediment chamber 26 after normal operation of separator assembly 10, the relatively pure water within discharge chamber 34 will cause liquid level height H1 to rise above liquid level height H2 because oil is lighter than water. After a quantity of effluent discharge has been processed, and no further influent mixture is flowing into separator assembly 10 through influent pipe 56, it should be understood that the relatively pure water within discharge chamber 30 will drain through outlet 22 until liquid level height H2 is approximately at the same height as that point at which effluent pipe 64 passes through the wall of tank 12. In accordance with the aforementioned manometer effect, liquid level height H1 within sediment chamber 26 will be some distance above the liquid level within discharge chamber 30.

Furthermore, in this quiescent state in which no influent mixture is entering separator assembly 10 through influent pipe 56, oil particles and some sediment already within the oil-water mixture inside influent pipe 56 will tend to rise, over time, upwardly within the downwardly extending portion of influent pipe 56. If influent pipe 56 passes through the wall of tank 12 at a sufficient height above the surface of the mixture within sediment chamber 26, it should be appreciated that oil and sediment rising to the surface within influent pipe 56 will be below inlet 20, and will therefore not accumulate and sediment within the horizontal portions of influent pipe 56. It should be noted that the oil level at the upper surface of the oil-water mixture within the vertical portion of influent pipe 56 during quiescent resting conditions will not be the same as that within the rest of tank 12 because of the relatively low oil particle concentrations within the influent oil-water mixture which subsequently rise upwardly within pipe 56 when no influent is flowing. In contrast, a substantial amount of oil will accumulate at the surface within separator chamber 24, sediment chamber 26, and oil removal chamber 30 during operation of separator assembly 10.

In one embodiment, the height at which effluent pipe 64 passes through the wall of tank 12 is such that approximately seventy-five percent (75%) of the total volume of tank 12 is therebelow. Similarly, the height at which influent pipe 56 passes through the wall of tank 12 is preferably chosen so that approximately eighty percent (80%) of the total volume of tank 12 is therebelow. It should be appreciated that these percentages may be adjusted in accordance with the particular liquids being separated and to accommodate a desired volume of accumulated separated liquid at the surface within separator chamber 24, sediment chamber 26, and oil removal chamber 30. If sedimentation within influent pipe 56 is not a problem in a given application of the present invention, and provided that sufficient hydraulic gradient exists from the influent source to the final destination of the effluent so as to cause flow through separator assembly 10, the height at which influent pipe 56 passes through the wall of tank 12 will not be critical, as should be understood by those skilled in the art.

The dynamic operation of surge control means, sediment chamber 26, oil removal chamber 30, and discharge chamber 34 may be selected to have substantially equal volumes, each equal to the volume that will hold one minute's or more flow of the design goal volume flow rate Q in cubic feet per second. In practice, these volumes may each be approximately ten to thirteen percent (10-13%) of the total volume of tank 12, leaving approximately sixty to seventy percent (60-70%) of the volume for separator chamber 24.

It should be understood that these percentages may vary, depending on the particular application, and have been chosen for a separator tank 12 having a length to width ratio between three and four. Other such ratios could be provided, constrained by size requirements of the finished apparatus or by structural limitations of tank 12. For instance, sediment chamber 26, if enlarged, would, for a given volume flow rate through separator assembly 10, retain the oil-water mixture therein for a greater time, thereby allowing solids, sludge, and sediment to settle to the bottom of sediment chamber 26 for later removal. Such an enlarged sediment chamber 26 might be required in those applications where substantial solids, sludge, and/or sediment are present in the incoming oil-water influent. Or, discharge chamber 34 may be enlarged for those applications where secondary effluent treatment, such as bulky filtering equipment and the like, is to be provided therewithin.

Upon installation, separator assembly 10 may be filled with water to the level of outlet 22. Initially, in the static resting state, with no oil-water mixture M flowing through separator assembly 10, the fluid levels of the various chambers within tank 12 will be, as previously described, at heights H1 and H2, each approximately even with the lower point of outlet 22 in this initial resting state. As liquid begins to enter separator assembly 10 through influent pipe 56, the liquid level within separator chamber 24 begins to rise due to the resistance provided by surge control means to fluid flow therethrough.

As best shown in FIG. 7, surge control means may include a pipe 66 connecting separator chamber 24 to discharge chamber 34, allowing the passage of purified water from separator chamber 24 to discharge chamber 34 through pipe 66. Pipe 66 extends through second baffle 32 and third baffle 36, and is circumferentially sealed thereto using sealing means well-known to those skilled in the art, such as welds, where pipe 66 respectively passes through second baffle 32 and third baffle 36. Pipe 66 has an inner diameter defining a passageway through pipe 66, and pipe 66 further has an end-to-end length L from end 74 within discharge chamber 34 to end 76 within separator chamber 24.

As liquid enters and leaves each of the chambers 34, 30, 24, and 26, each chamber will obey the rules of conservation of mass such that the difference in volume flow rates in and out will produce an accumulated volume of liquid within each chamber, causing the liquid level within each chamber to rise in a manner well-known to those skilled in the art. For instance, as the liquid level within discharge chamber 34 rises above the height of outlet 22, effluent water will exit tank 12 through effluent pipe 64. Similarly, as oil-water mixture M enters sediment chamber 26, and surge control means offers resistance to the movement of liquid therethrough, the surface height of mixture M within chambers 30, 24, and 26 will rise as the volume of mixture M therein increases. Because of the relatively vast internal volume of tank 12 occupied by chambers 30, 24, and 26, typically ninety percent (90%) of tank 12, the rise in height of mixture M therein will be rather slow, and any sudden surges and accelerations in the flow of mixture M are absorbed as surge control means regulates the flow out of separator chamber 24.

The inner diameter of pipe 66 may be in proportion to and equal to the inner diameter of influent and effluent pipes 56 and 64, respectively. It shall be understood that inner diameter of pipe 66 is a compromise, being small enough to offer resistance to water flowing through pipe 66, yet large enough so that the fluid level within tank 12 upstream of surge control means does not rise substantially above inlet 20. The fluid at the height of end 76 and entering passageway therethrough may be substantially free of oil particles. The downwardly acutely angled opening 80 at end 76 of pipe 66 reduces any downward flow by oil particles above pipe 66 thereinto because most of the fluid entering pipe 66 will be from regions therebelow. Furthermore, end 76 of pipe 66 may extend a distance of at least 1.5 times inner diameter of pipe 66 into separator chamber 24 so that swirling boundary effects and eddies where flowing oil-water mixture M impacts second baffle 32 will not be seen at angled opening 80.

The length of pipe 66 from end 74 to end 76 may be chosen to be between three and six times inner diameter so that entrance effects within pipe 66 from angled opening 80 will have subsided by the time water exits end 74 and so that the flow through pipe 66 will have assumed a substantially symmetric cylindrical shape. While pipe 66 could be longer and extend substantially further than shown into separator chamber 24, such an extension could tend to draw into pipe 66 oil particles that have not yet risen a sufficient distance above opening 80.

All flow of oil-water mixture M must pass through a first gate 90 (shown in FIG. 5) for preventing the flow into separator chamber 24 of any of oil-water mixture M below a first gate height above the bottom of tank 12. In one embodiment, first gate 90 is an opening 92 in first baffle 28 with the lower surface of opening 92 forming a weir 94 at first gate height above the bottom of tank. Because weir 94 is at height, it is impossible for oil particles to enter the separator chamber 24 below height H4 and therefore all oil particles will be at least a height H4 above the bottom of tank 12. The slow flow of oil-water mixture M past weir 94 will cause a slight downward movement of oil particles flowing thereover as the particles follow the stream lines of the flowing mixture, but, providing the velocity of mixture M is not great, the particles will not move substantially below height H4. Additionally, weir 94 acts as a sludge baffle, trapping sludge and sediment that has settled to the bottom of sediment chamber 26 within sediment chamber 26 for later scheduled removal, thereby preventing the flow into separator chamber 24 of sediment below height H4.

Similarly, interposed between separator chamber 24 and oil removal chamber 30 is a second gate 96 (FIG. 6) for preventing the recirculation of oil particles, which have moved there past into oil removal chamber 30, back into separator chamber 24 below a second gate height H5 above the bottom of tank 12, it being understood that first gate height H4 is lower than second gate height H5. In one embodiment, second gate 96 has opening 98 in the second baffle 32 with the lower surface of opening 98 forming a weir 100 at second gate height H5 above the bottom of tank 12. A portion of baffle 32 below weir 100 may also be used as a structural support for pipe 66 as shown. Because weir 100 is at height H5, that all oil particles within oil-water mixture M of height H5 or above will flow into oil holding chamber 30 in a manner hereinafter described. In one embodiment, height H4 is chosen so that approximately twenty-eight percent (28%) of the volume of tank 12 is therebelow. Similarly, height H5 is preferably chosen so that fifty-eight to fifty-nine percent (58% to 59%) (i.e., approximately sixty percent (60%) of the volume of tank 12 is therebelow). These percentages may be varied depending on the particular application and the desired oil storage volume at the oil-water surface within tank 12.

Rising oil particles being carried with the slowly moving flow of oil-water mixture M will follow upwardly rising curved paths, respectively. Oil particles having a diameter of twenty microns may move through the separator assembly 10 an upward rise velocity of at least 0.0125 feet per second (0.15 inches per second). The flow path length through separator chamber 24 from first gate 90 to second gate 96 may be of sufficient length so that an oil particle of a given diameter, such as twenty microns, will rise from its entry height H4 into separator chamber 24 to a final height of at least H5 upon its exit into oil holding chamber 30. Oil particles greater than this given diameter may rise more quickly toward the upper surface of oil-water mixture M. Therefore, once a given flow path length through separator chamber 24 is fixed by the rise velocity of a chosen diameter oil particle, all oil particles of that diameter or greater may be above height $h_5$ upon reaching second gate 96.

The time any given oil particle has in which to rise from height H4 to H5 will depend upon the velocity of oil-water mixture M through separator chamber 24 from first gate 90 to second gate 96. Oil-water mixture M flows through a horizontal channel 118 formed within the separator chamber 24 by vertical plates or separation walls 101, 102, 103, 104, 105, and 106 extending longitudinally from first and second baffles 28 and 32 into chamber 24 and extending upwardly from the bottom of tank 12, preferably sealed thereto by means, such as welding, well-known to those skilled in the art. The vertical plates are parallel to one another and redirect the flow of oil-water M through the separation chamber.

In order for oil-water mixture M to flow into oil holding chamber 30, conservation of mass requires that an equivalent volume flow out of chamber 30. For this purpose, a return path is provided for allowing the flow of fluid from a bottom portion of oil holding chamber 30 back to separator chamber 24 upstream of second gate 96. Referring to FIG. 6, the return path may be an opening 130 through second baffle 32 near the bottom of oil holding chamber 30, allowing the pure water at the bottom of oil holding chamber 30 to flow therefrom back into separator chamber 24. Opening 130 should be sized so that the expected volume of fluid (i.e., relatively pure water) passing therethrough back into separator chamber 24 equals the expected volume of oil passing into oil holding chamber 30 through second gate 96.

In order for the preceding results concerning the various rise velocities of oil particles to be true, Stokes' law must apply, or at least be a reasonable approximation. Stokes' law, as previously noted, is only strictly applicable in a quiescent and non-moving fluid, and is a reasonable approximation only in a "creeping flow." Stokes' law is also rendered completely useless if the flow is substantially turbulent (i.e., non-laminar) because oil particle movement would then become dominated by turbulent forces and not the natural buoyancy of the particles.

A practical application of the theory disclosed in U.S. Pat. No. 5,266,191, which is hereby expressly incorporated herein by reference, illustrated in FIGS. 4-8. Horizontal channel 118 comprises a sequence of serially joined channel portions winding a serpentine path from weir 94 to weir 100. As previously mentioned, horizontal channel 118 is formed within separator chamber 24 by vertical plates 101, 102, 103, 104, 105, and 106 extending longitudinally from first and second baffles 28 and 32 into chamber 24 and extending upwardly from the bottom of tank 12, sealed thereto by means, such as welding, well-known to those skilled in the art. Plates 101, 102, 103, 104, 105, and 106 need not extend all the way to the top of tank 12, but may be spaced a short distance therefrom as shown for ease of manufacture, it being understood that the surface of oil-water mixture M does not typically reach to the top of tank 12, thereby precluding the flow of oil-water mixture M over the tops of plates 101, 102, 103, 104, 105, and 106. Even if oil-water mixture M were to flow over the tops of these plates, no substantial impairment of operation would result because the surface of oil-water mixture M is where the oil within separator assembly 10 collects, and such a flow would merely pass surface oil from one portion of separator chamber 24 to another, with no effect on the purer water therebeneath.

In one embodiment, the transverse cross-sectional area of each of channel portions may be equal so that the velocity of oil-water mixture M through each is the same. The various plate spacings shown in FIGS. 4-6 may be somewhat exaggerated for purposes of illustration, but are intended to indicate that the transverse cross-sectional area of each channel portion is substantially the same.

To control the Reynolds number of the channel portions, one or more of horizontally-spaced parallel vertical plates 141, 142, 143, 144, and 145 subdivide the channel portions in a number of sub-channels, each which may have the same transverse cross-sectional area. Plates 141-145 may extend longitudinally for substantially the entire length of channel portion and may extend vertically from a lower point near the bottom of tank 12 to a higher point near the top of tank 12. Plates 141-145 may be horizontally spaced apart from plates 101-106, respectively, and supported by turn buckles 120, or other means well-known to those skilled in the art. While plates 141-145 could extend the entire distance from the bottom of tank 12 to the top of tank 12, in the one embodiment they do not, for ease of manufacture. The discussion above about the flow of surface oil over the tops of plates 101-106 applies equally here. Additionally, the water at the bottom of tank 12 is rather pure and slow moving; the slight migration of water between the bottoms of sub-channels will not substantially disturb the upward rise of oil particles thereabove.

It should be understood that outer channel portions could be subdivided by horizontally-spaced parallel vertical plates in a manner similar to inner channel portions for similar control of the Reynolds numbers of outer channel portions, thereby controlling the turbulence therein. Although two outer un-subdivided channel portions and five subdivided inner channel portions are shown, it shall be understood that the numerosity of either may be greater or lesser. For example, tank 12 could be more elongated with a single subdivided channel portion therethrough, or it could be less elongated with a more serpentine path of horizontal channel 118 therein. The essential requirement is that sufficient transit time be allowed for oil particles to rise in a manner previously described.

Referring now to FIGS. 9-13, the lid 14 of the separator assembly 10 is illustrated. As previously mentioned in relation to tank 12, the lid 14 creates a seal over the tank 12 and includes one or more access openings 41 selectively sealable with hatches or doors 42. The lid 14 further includes one or more tabs 48, which are receivable by the V-blocks 38 (FIG. 2) for aligning the lid 14 upon the tank 12. The lid 14 may include a first top panel 202, a second top panel 204, a strip 206 extending longitudinally between first top panel 202 and second top panel 204, a first end panel 208 and a second end panel 210 positioned at the ends of top panels 202 and 204, and one or more gussets or support panels 205 and 207 positioned between end panels 208 and 210 along the angled bottom sides of top panels 202 and 204. The lid 14 further includes a seal member 209 at a bottom edge perimeter of the lid 14 for creating a seal between the lid 14 and the tank 12. The seal member 209 may be formed of any suitable material, such as rubber, for creating a gas tight seal with the upper end of the tank 12. The seal member 209 is configured to sealingly engage an upper flanged surface 211 of the tank 12.

Top panel 202 includes one or more hatch or door frames, such as frames 216 defining openings 41. Similarly, top panel 204 includes one or more hatch or door frames, such as frames 216, which define openings, such as openings 41.

End panels 208 and 210 also include tabs 48 for aligning the lid 14 with the tank 12 and may be similarly shaped to support the panels 205 and 207. End panel 208 includes a capped port 228, and end panel 210 includes a capped port 230. Support panels 205 and 207 include a plurality of openings, such as opening 236a-236f, which define passages through the gussets 205 and 207 to facilitate airflow under the lid 14 and for cooperating with ports 228 and 230 to provide gas circulation in the separator assembly 10. For example, because the lid 14 is sealed to the tank 12, an operator may implement a vacuum or forced air ventilation system to cause air to flow into port 230, through the top of the tank 12 and the openings in support panels 205 and 207, and out of port 228. In this way, undesirable fumes can be contained and passed to a suitable combustor or flare.

Figure 9:
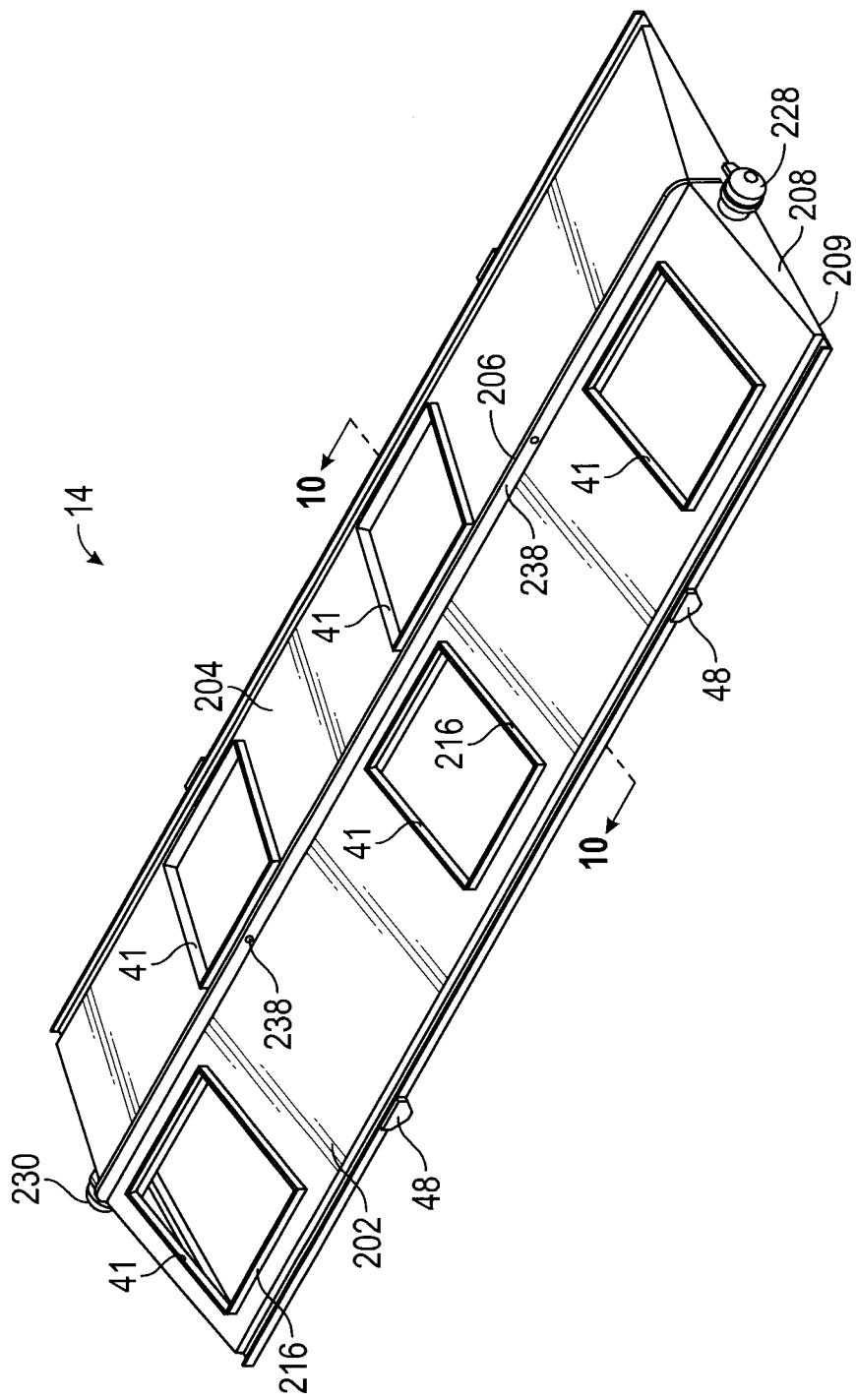
FIG. 9 is a top perspective view of the lid.
Figure 10:
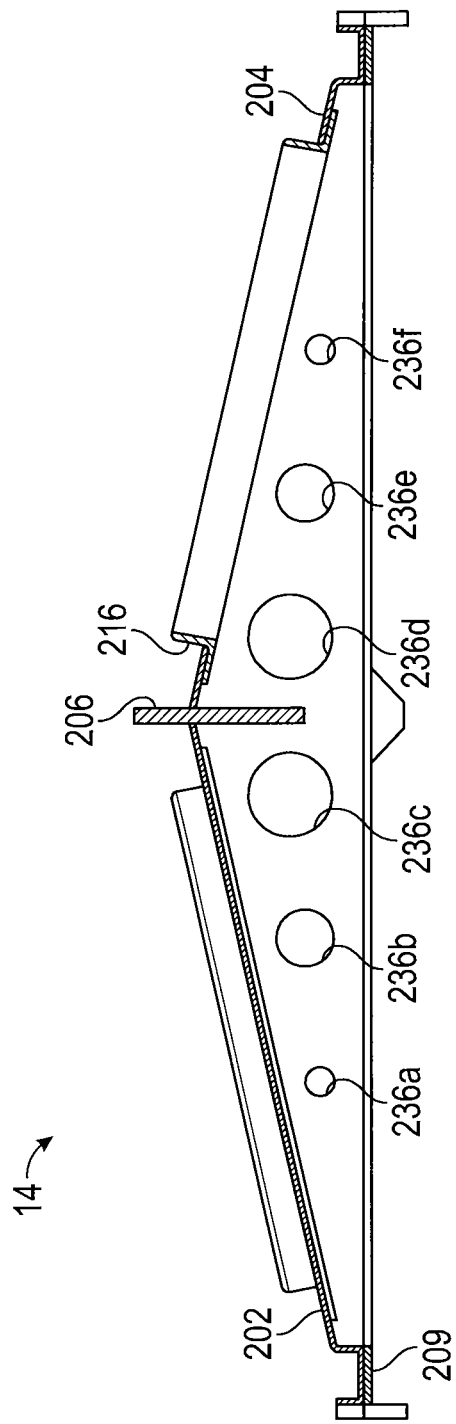
FIG. 10 is a cross sectional view taken along line 10-10 of FIG. 9.
Figure 11:
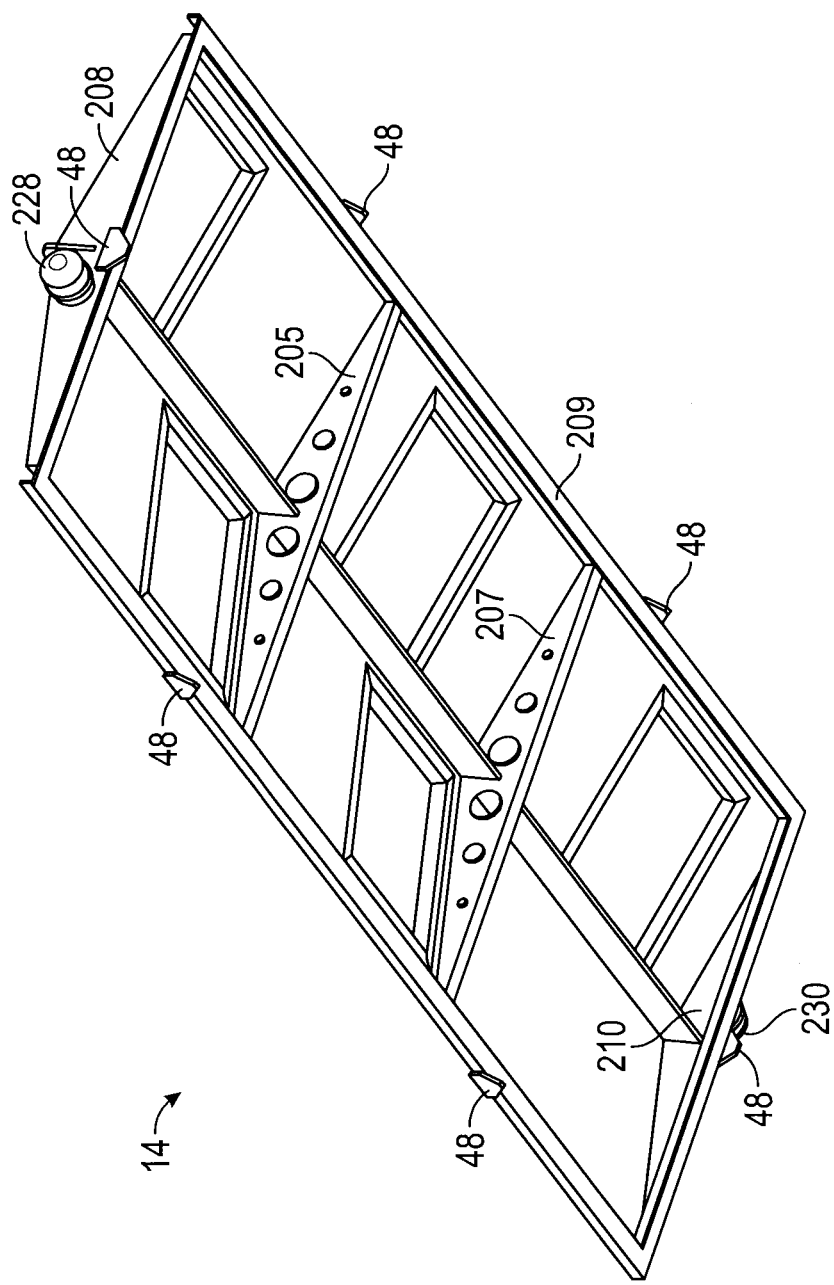
FIG. 11 is a bottom perspective view of the lid of FIG. 9.

To remove the lid 14 from tank 12, the strip 206 may be provided with one more lifting eyes, such as lifting eyes 238 (FIG. 9).

Figure 12:
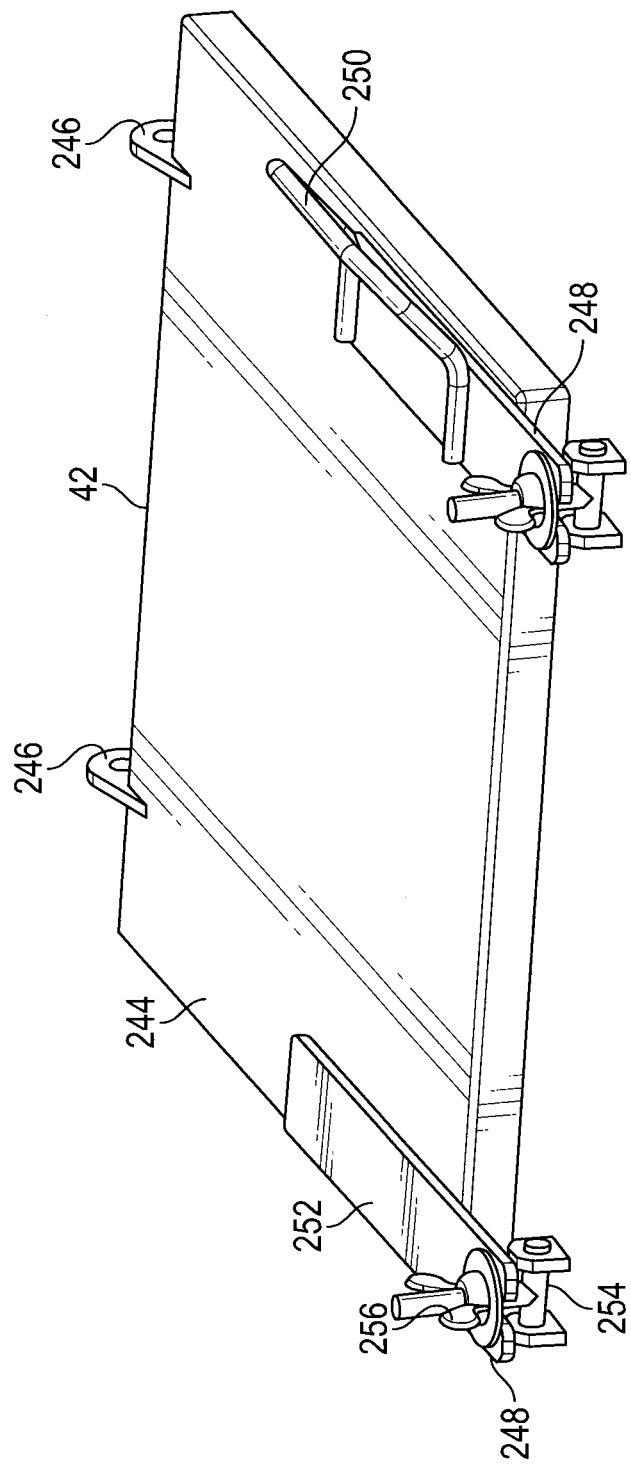
FIG. 12 is a top perspective view of an access door of the lid.
Figure 13:
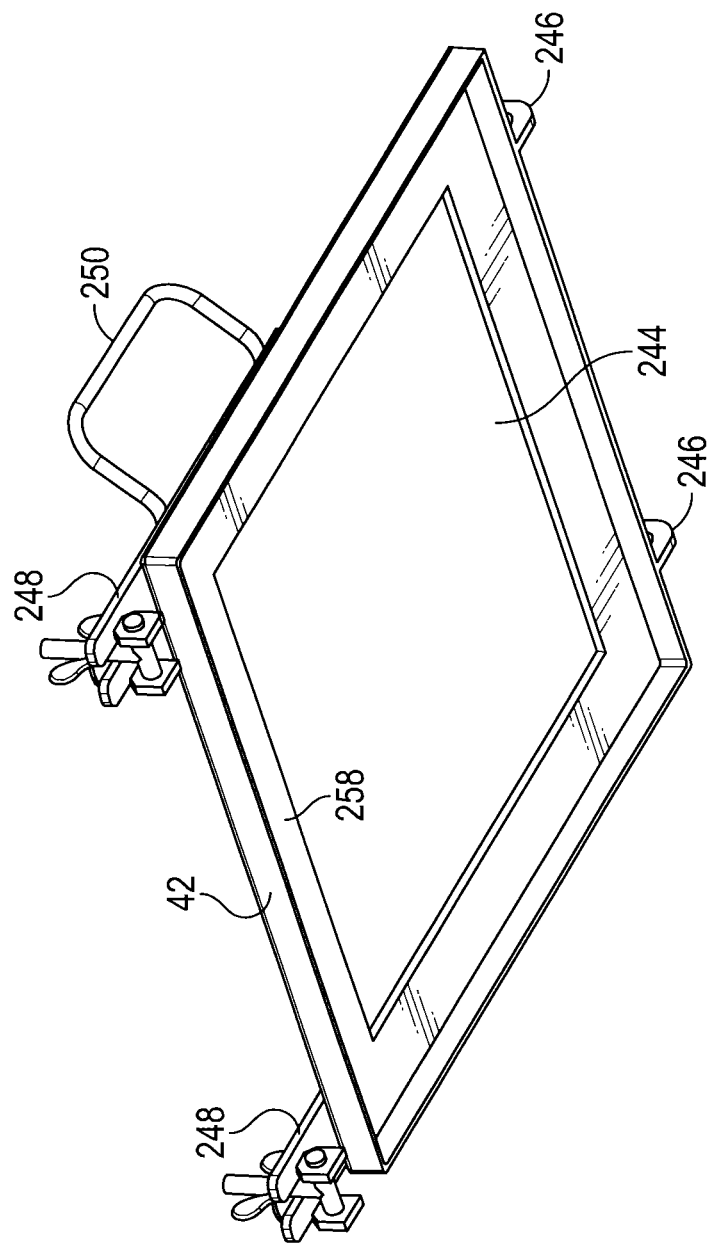
FIG. 13 is a bottom perspective view of the access door of FIG. 12.
Figure 14:
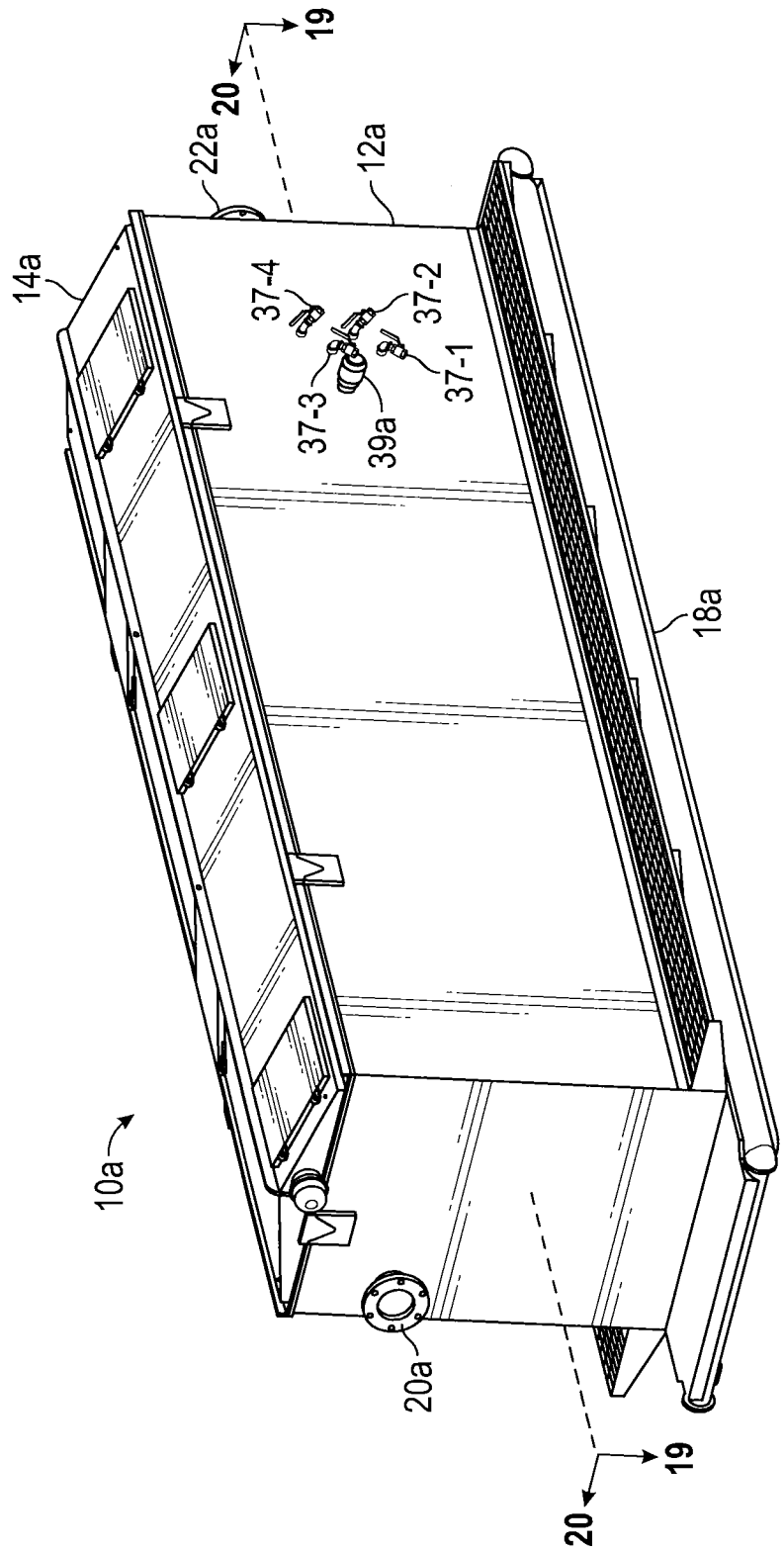
FIG. 14 is a perspective view of another embodiment of a separator assembly constructed in accordance with the inventive concepts disclosed herein.
Figure 15:
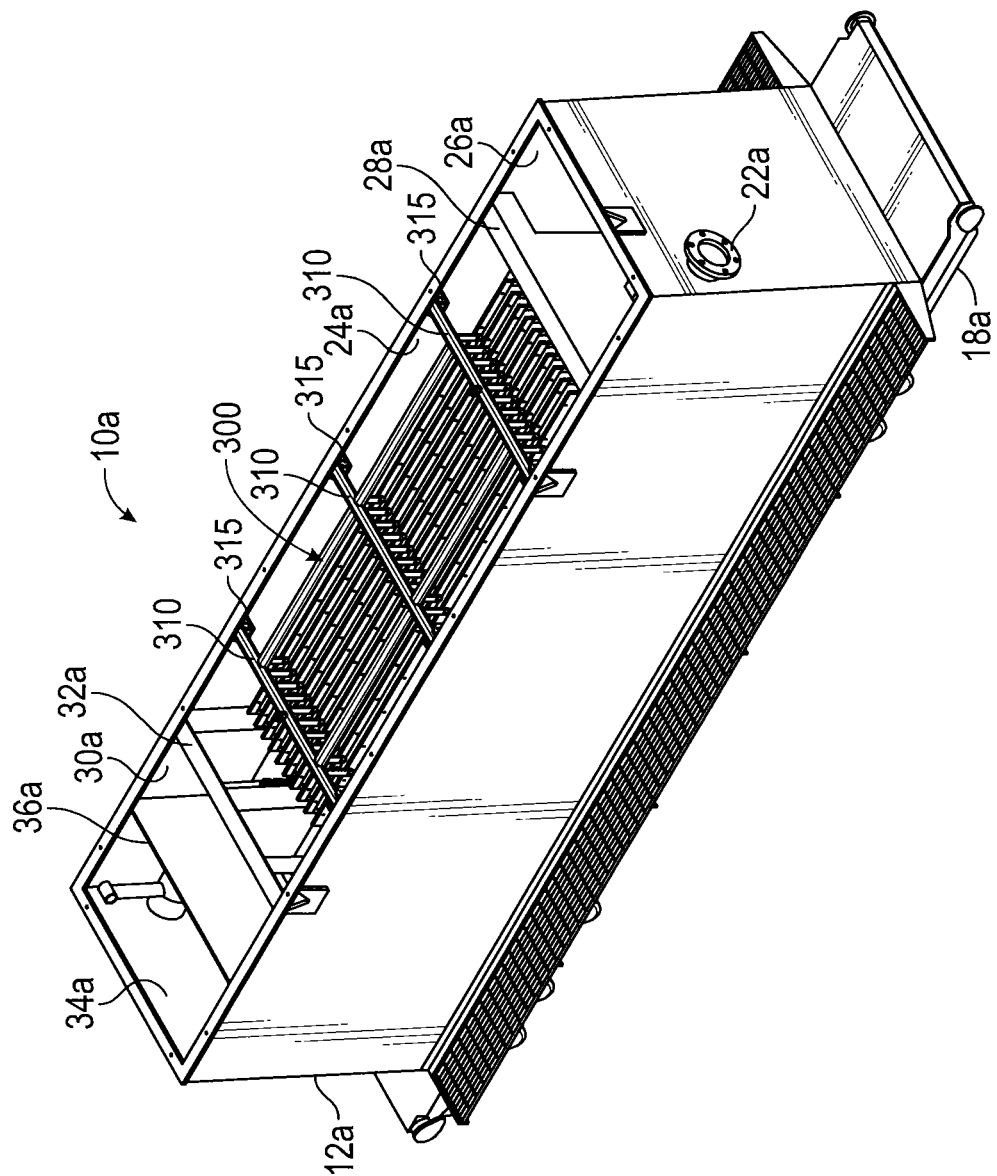
FIG. 15 is a perspective view of the separator assembly with a lid of the separator assembly removed therefrom.
Figure 16:
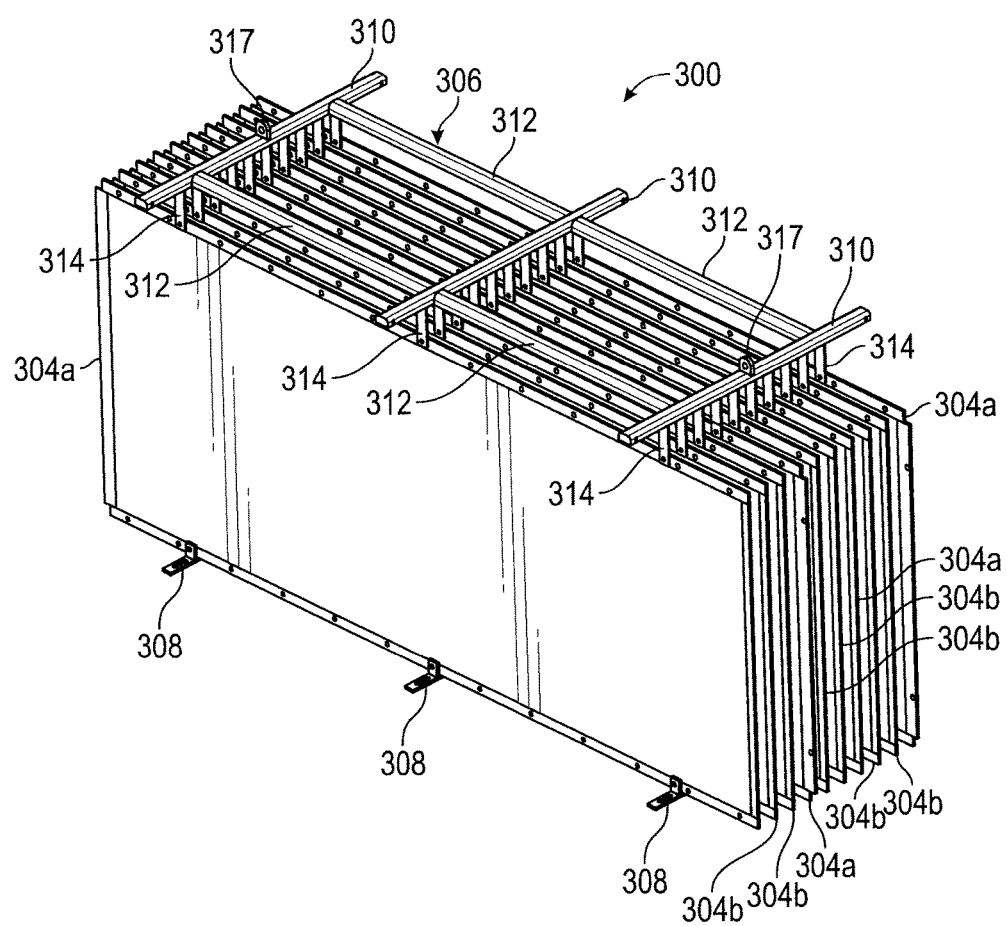
FIG. 16 is a perspective view of a plate assembly of the separator assembly.
Figure 17:
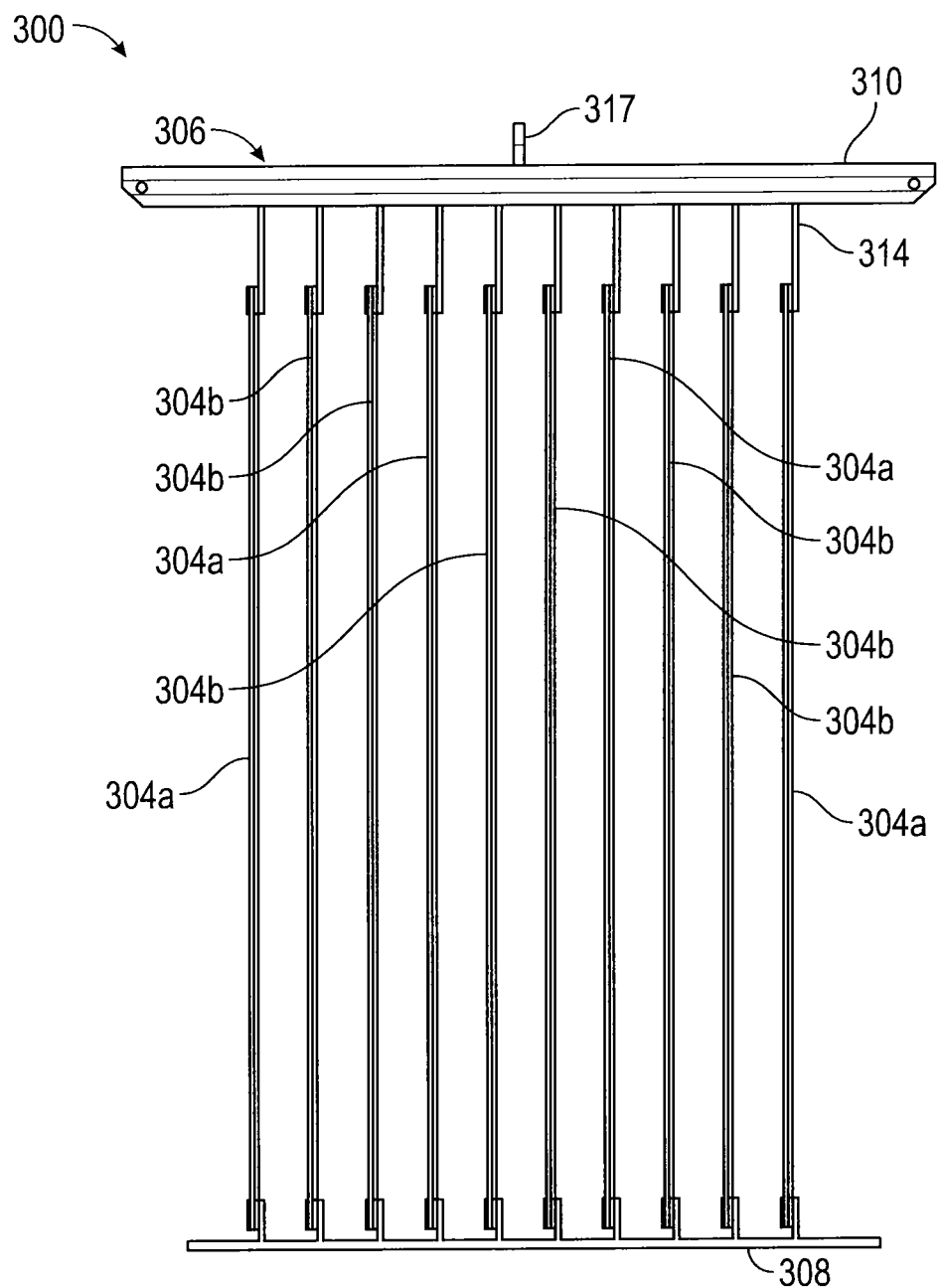
FIG. 17 is an end view of the plate assembly of FIG. 16.
Figure 18:
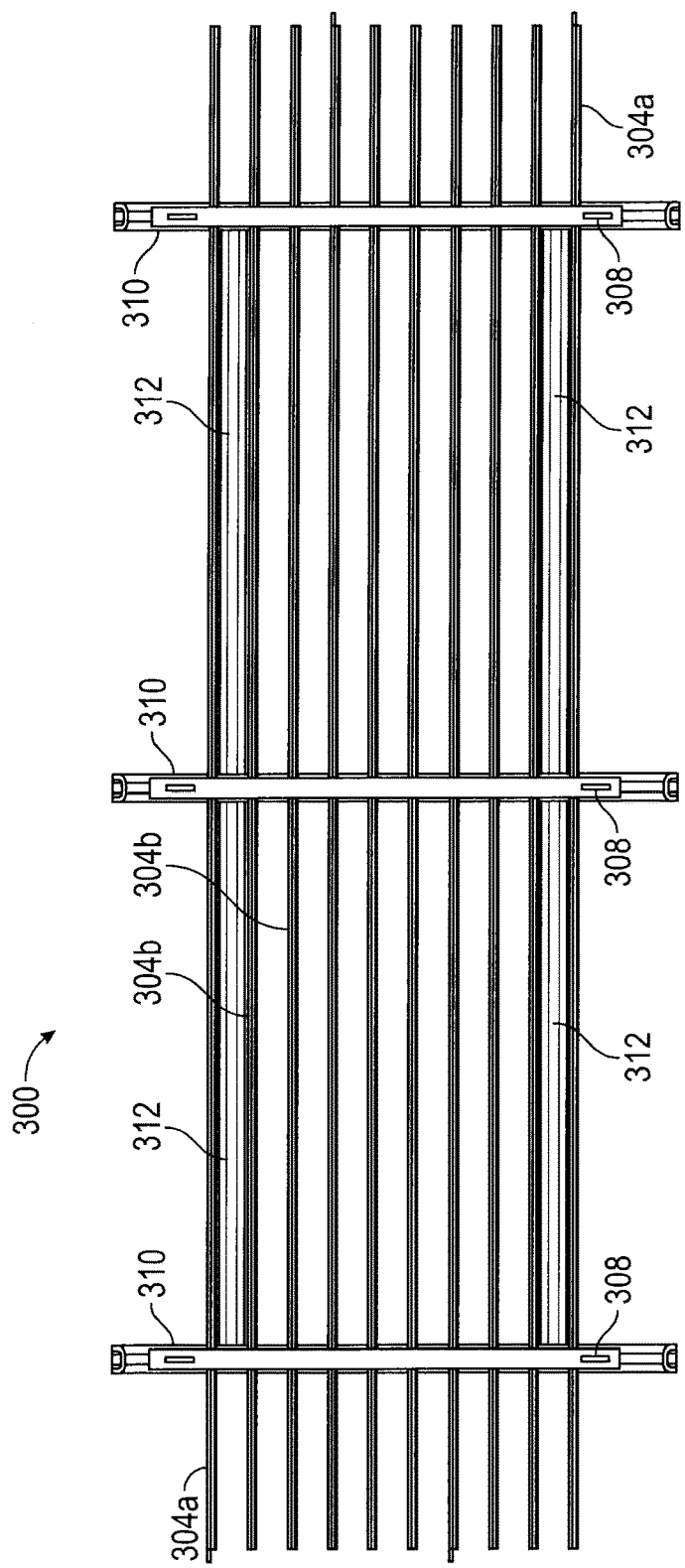
FIG. 18 is a bottom view of a plate assembly of FIG. 16.
Figure 19:
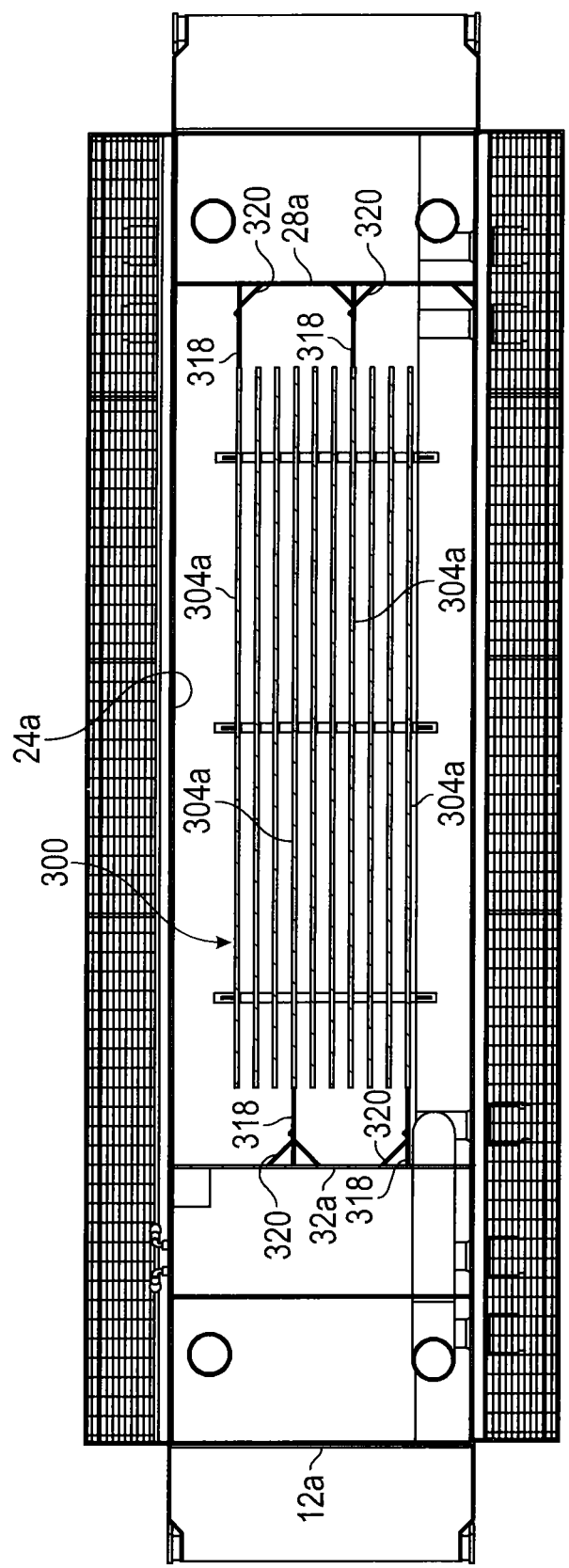
FIG. 19 is a cross sectional view taken along line 19-19 of FIG. 14.
Figure 20:
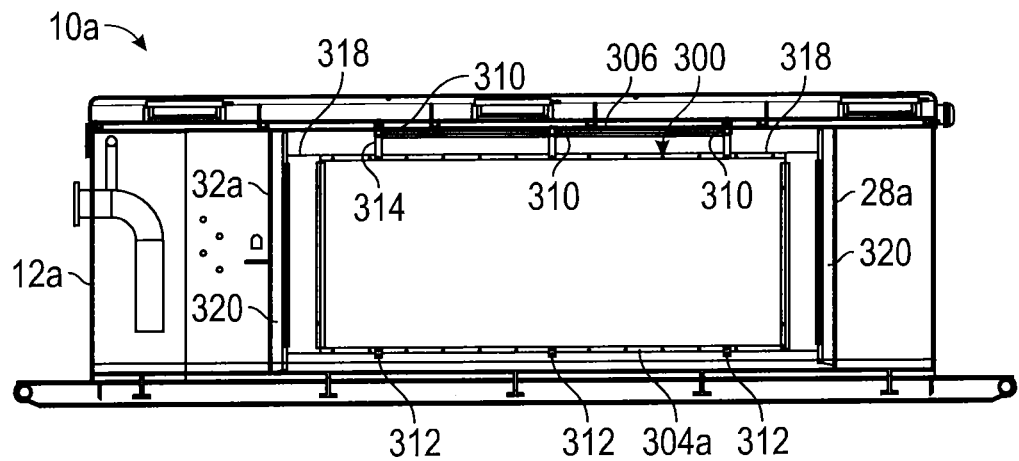
FIG. 20 is a cross sectional view taken along line 20-20 of FIG. 14.

Referring now to FIGS. 12 and 13, the access doors 42 will be described in further detail. For purposes of being concise, access door 42 is shown and hereinafter described, however, it should be appreciated that all of the access doors may be constructed substantially the same. Access door 42 includes a door panel 244, hinges 246 upon which panel 244 rotates, one or more latching assemblies 248 for securing the access door to the lid 14, a handle 250 attached to one or more latching assembly 248 for opening the access door 42 to the tank 12, and a seal member 258. Latching assembly 248 includes a latching arm 252, which may be received by a screw unit 254 through an opening (not shown) in latching arm 252. Screw is attached to the lid 14 in a suitable manner, such as by welding. To secure latching arm 252 to screw unit 254, and therefore the lid 14, a nut 256 may be threaded on a screw of screw unit 254 so that latching arm 252 is tightly positioned between nut 256 and screw unit 254. The seal member extends along the inner bottom perimeter of the door panel 244 to form a gas tight seal between the seal access door 24 and the lid 14. The seal member 258 may be formed of any suitable material, such as rubber.

Referring now to FIGS. 14-23, another embodiment of a separator assembly 10a constructed in accordance with the inventive concepts disclosed herein is illustrated. The separator assembly 10a is similar to the separator assembly 10 except that the separator 10a employs a unitary plate assembly, which will be described in detail below. The separator assembly 10a broadly includes a tank 12a, a lid 14a, removably attached to the tank 12a, and a skid 18a for supporting and facilitating access to the tank 12a. The separator assembly 10a may be installed and operated in conjunction with a variety of other solids and fluids separation equipment. The tank 12a of the separator assembly 10a includes an inlet 20a through which oil-water mixture enters the separator assembly 10a, an outlet 22a through which water exits the separator assembly 10a, a separator chamber 24a, an influent or sediment chamber 26a separated from the separator chamber 24a by a first bulkhead or baffle 28a and interposed between separator chamber 24a and the inlet 20a, an oil holding or oil remover chamber 30a downstream of the separator chamber 24a and separated from the separator chamber 24a by a second bulkhead or baffle 32a, and an effluent or discharge chamber 34a separated from the oil removal chamber 30a by a third bulkhead or baffle 36a and interposed between the oil removal chamber 30a and the outlet 22a. The tank 12a also includes one or more valves 37-1, 37-2, 37-3, and 37-4 for determining the level of liquid in the oil removal chamber 30a, and a port 39a for removing oil therefrom.

With reference to FIGS. 15-20, the separator assembly 10a further includes a plate assembly 300. The plate assembly 300 is constructed as a one-piece unit externally of the tank 12a and then positioned into the tank 12a and secured thereto. The plate assembly 300 allows an oil-water mixture to flow through the separator chamber 24a in a serpentine path defined by vertical plates of the plate assembly 300 positioned within the separator chamber 24a so as to extend longitudinally between the first and second baffles 28a and 32a.

The plate assembly 300 includes a plurality of plates 304a and 304b, an upper support frame 306, and a plurality of lower support members 308. The upper support frame 306 and the lower support members 308 support the plates 304a and 304b in a spaced-apart, parallel relationship relative to one another. The plates 304a and 304b cooperate with the sides of the tank 12a and the baffles 28a and 32a to define a serpentine path from the baffle 28a to the baffle 32a in a manner similar to that described above for the separator assembly 10. The plates 304a and 304b are similar in construction with the exception that the plates 304a are configured to be interconnected to the baffles 28a and 32a with hinge plates (described below) in a way that defines the serpentine path through the separator chamber 24a and provides beveled corners to facilitate laminar flow. As discussed in reference to the separator assembly 10, one or more of the plates 304b are positioned between adjacent plates 304a at a predetermined spacing to guide the fluid from one end of the separator chamber 24a to the other end of the separator chamber 24a. As also discussed above, the plates 304a and 304b need not extend all the way to the top of the tank 12a when the plate assembly 300 is positioned in the tank 12a, but may be spaced a distance from the top and bottom, as illustrated.

The plates 304a and 304b are supported relative to one another by the upper support frame 306 and the lower support members 308. The upper support frame 306 is shown to include a plurality of cross members 310 and a plurality of brace members 312. The upper support frame 306 is shown to have three cross members 310. However, it will be appreciated that the number of cross members 310, as well as the number of lower support members 308, may be varied. The upper support frame 306 is connected to the plates 304a and 304b with a plurality of connector members 314 in a way that the plates 304a and 304b are suspended from the upper support frame 306. The cross members 314 have a length such that the ends of the cross members 314 are received in support brackets 315 provided at the upper end of the sides of the tank 12a within the separator chamber 24a. One or more of the cross member 306a of the upper support frame 306 may include a ring or hook 317 to facilitate insertion and removal of the plate assembly 300 with a crane or other suitable device for lifting and lowering materials.

The lower cross members 308 are connected to the lower ends of the plates 304a and 304b in a way that the plates 304a and 304b are maintained in a spaced apart, parallel relationship relative to one another. Further, the lower support members 308 serve as a base for supporting the plate assembly 300 on a support surface when the plate assembly 300 is removed from the tank 12a.

Figure 21:
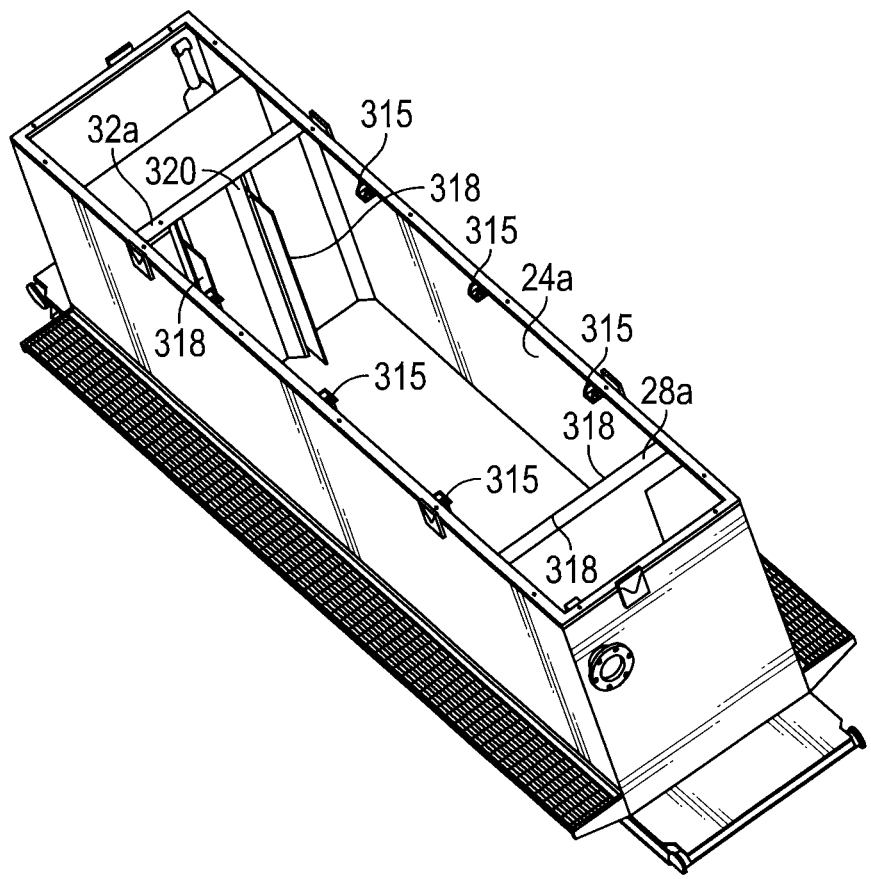
FIG. 21 is a perspective view of the separator assembly with the lid and the plate assembly removed therefrom.
Figure 22:
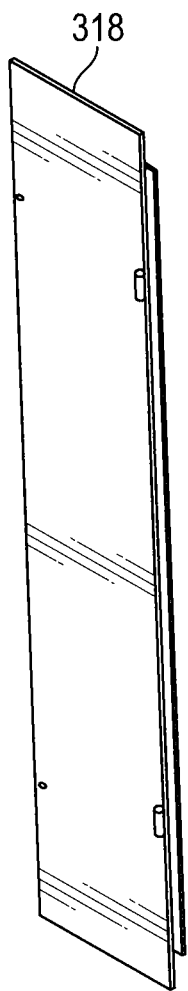
FIG. 22 is a perspective view of a hinge plate.
Figure 23:
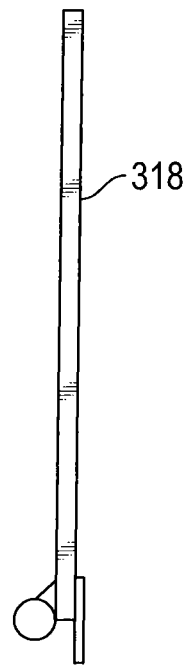
FIG. 23 is a top plan view of the hinge plate of FIG. 22.

The plate assembly 300 is positioned in the separator chamber 24a so that the ends of the cross members 310 are received by the support brackets 315. As shown in FIG. 21, the plate assembly 300 may have a height that results in the lower cross members 308 being elevated a distance from the bottom of the tank 12a. Each of the plates 304a is interconnected to the respective baffles 28a and 32a to form the serpentine path with a hinge plate 318. The hinge plate 318 serves as an extension from the plates 304a to the baffles 28a and 32a. To facilitate connection of the hinge plates 318 to the baffles 28a and 32a, the baffles 28a and 32a are provided with a plurality of extension portions 320. The extension portions 320 extend inwardly into the separator chamber 24a to form beveled corners that facilitate laminar flow through the separation chamber. One side of the hinge plate 318 is hinged to the extension portion 320 and the other side of the hinge plate 318 is removably connected to the end of the plate 304a with fasteners, such as with a plurality of nut and bolt combinations. The hinged connection of the hinge plates 318 to the extension portion 320 facilitates making the connection between the hinge plates 318 and the plates 304a. To remove the plate assembly 300 from the tank 12a, the plates 304a are disconnected from the hinge plates 318, and the plate assembly 300 is lifted from the tank 12a.

From the above description, it is clear that the present inventive concept is well adapted to carry out the objects and to attain the advantages mentioned herein as well as those inherent in the invention. While exemplary embodiments of the invention have been described for purposes of this disclosure, it will be understood that numerous changes may be made which will readily suggest themselves to those skilled in the art and which are accomplished within the spirit of the inventive concept disclosed claimed herein.

What is claimed is:

1. A separator assembly for separating oil from water, comprising:
    a tank having a first end, a second end, a first side, a second side, a bottom side, and a top side, the top side being open, the tank further including:
        an influent chamber defined by the first end, a portion of the first side and the second side, and a first baffle;
        a separator chamber defined by the first baffle, a portion of the first side and the second side, and a second baffle;
        an oil chamber defined by the second baffle, a portion of the first side and the second side, and a third baffle; and
        an effluent chamber defined by the third baffle, a portion of the first side and the second side, and the second end,
        wherein the influent chamber has an inlet through which an oil-water mixture enters, the oil chamber has a first outlet through which oil is discharged, and the effluent chamber has a second outlet through which water is discharged,
        wherein the first baffle has an opening causing the influent chamber and the separator chamber to be in fluid communication with one another, the second baffle has an opening causing the separator chamber and the oil chamber to be in fluid communication one with one another; and
    a pipe extending from the separator channel, through the second baffle, the oil removal chamber, and the third baffle, and into the effluent chamber allowing the passage of water from the separator chamber to effluent chamber;
    a plurality of vertical plates positioned in the separator chamber to define a serpentine path from the opening of the first baffle to the opening of the second baffle; and
    a lid removably attached to top side of the tank so as to create a gas tight seal with the top side of the tank, wherein the lid comprises:
        a first top panel having a top side and a bottom side;
        a second top panel having a top side and a bottom side, the second top panel connected to the first top panel so that the first top panel and the second top panel are angled relative to one another;
        a first end panel positioned at one end of the first top panel and one end of the second top panel; and
        a second end panel positioned at an opposite end of the first top panel and an opposite end of the second top panel,
        wherein the first top panel, the second top panel, the first end panel, and the second end panel cooperate to form a vapor capturing space in fluid communication with the influent chamber, the separator chamber, the oil chamber, and the effluent chamber, and
        wherein the first end panel has a gas inlet port and the second end panel has a gas outlet port to permit air to flow into the gas inlet port, through the vapor capturing space, and out of the gas outlet port to remove vapors captured in the vapor capturing space.

2. The separator assembly of claim 1, wherein the lid includes one or more access openings selectively sealable.

3. The separator assembly of claim 1, wherein the top side of the tank has a plurality of V-blocks, and wherein the lid has a plurality of tabs receivable in the V-blocks in a way that the lid is aligned with the tank when the tabs are received in the V-blocks.

4. The separator assembly of claim 1, wherein the lid comprises:
    one or more support panels positioned between the first end panel and the second end panel along the bottom side of the top panel and the second top panel,
    wherein each of the of the support panels includes a plurality of openings to facilitate airflow through the vapor capturing space.

5. The separator assembly of claim 1, wherein the vertical plates are constructed as a unitary plate assembly.

6. The separator assembly of claim 5, wherein the unitary plate assembly includes an upper support frame connected to an upper end of the each of the plates and a plurality of lower support members connected to a lower side of each of the plates so as to support the plates in a spaced-apart, parallel relationship relative to one another.

7. The separator assembly of claim 6, wherein the tank has a plurality of support brackets, wherein the upper frame has a plurality of cross members, and wherein the plate assembly is positioned in the separator chamber with the cross members received in the support brackets.

8. The support assembly of claim 7, wherein the plate assembly has a height that results in the lower cross members being elevated a distance from the bottom of the tank.

9. The support assembly of claim 8, wherein one end of a portion of the plates is interconnected to the first baffle with a hinge plate extending from the first baffle and hingedly connected to the plate and an opposing end of another portion of the plates is interconnected to the second baffle with a hinge plate extending from the second baffle and hingedly connected to the plate to form the serpentine path.

10. The support assembly of claim 9, wherein the first baffle has a plurality of extension portions extending inwardly into the separator chamber to define beveled corners between the first baffle and the hinge plates of the first baffle, and wherein the second baffle has a plurality of extension portions extending inwardly into the separator chamber to define beveled corners between the second baffle and the hinge plates of the second baffle.

11. A separator assembly for separating oil from water, comprising:
a tank having a first end, a second end, a first side, a second side, a bottom side and a top side, the tank further including:
an influent chamber defined by the first end, a portion of the first side and the second side, and a first baffle;
a separator chamber defined by the first baffle, a portion of the first side and the second side, and a second baffle;
an oil chamber defined by the second baffle, a portion of the first side and the second side, and a third baffle; and
an effluent chamber defined by the third baffle, a portion of the first side and the second side, and the second end,
wherein the influent chamber has an inlet through which an oil-water mixture enters, the oil chamber has a first outlet through which oil is discharged, and the effluent chamber has a second outlet through which water is discharged,
wherein the first baffle has an opening causing the influent chamber and the separator chamber to be in fluid communication with one another, the second baffle has an opening causing the separator chamber and the oil chamber to be in fluid communication one with one another; and
a pipe extending from the separator channel, through the second baffle, the oil removal chamber, and the third baffle, and into the effluent chamber allowing the passage of water from the separator chamber to effluent chamber; and
a plurality of vertical plates positioned in the separator chamber to define a serpentine path from the opening of the first baffle to the opening of the second baffle, the plates constructed as a unitary plate assembly,
wherein one end of a portion of the plates is interconnected to the first baffle with a hinge plate extending from the first baffle and hingedly connected to the plate and an opposing end of another portion of the plates is interconnected to the second baffle with a hinge plate extending from the second baffle and hingedly connected to the plate to form the serpentine path.

12. The separator assembly of claim 11, wherein the unitary plate assembly includes an upper support frame connected to an upper end of the each of the plates and a plurality of lower support members connected to a lower side of each of the plates so as to support the plates in a spaced-apart, parallel relationship relative to one another.

13. The separator assembly of claim 12, wherein the tank has a plurality of support brackets, wherein the upper frame has a plurality of cross members, and wherein the plate assembly is positioned in the separator chamber with the cross members received in the support brackets.

14. The support assembly of claim 13, wherein the plate assembly has a height that results in the lower cross members being elevated a distance from the bottom of the tank.

15. The support assembly of claim 11, wherein the first baffle has a plurality of extension portions extending inwardly into the separator chamber to define beveled corners between the first baffle and the hinge plates of the first baffle, and wherein the second baffle has a plurality of extension portions extending inwardly into the separator chamber to define beveled corners between the second baffle and the hinge plates of the second baffle.

16. A method of forming a separator assembly for separating oil from water, comprising:
obtaining a tank having a first end, a second end, a first side, a second side, a bottom side and a top side, the top side being open, the tank further including:
an influent chamber defined by the first end, a portion of the first side and the second side, and a first baffle;
a separator chamber defined by the first baffle, a portion of the first side and the second side, and a second baffle;
an oil chamber defined by the second baffle, a portion of the first side and the second side, and a third baffle; and
an effluent chamber defined by the third baffle, a portion of the first side and the second side, and the second end,
wherein the influent chamber has an inlet through which an oil-water mixture enters, the oil chamber has a first outlet through which oil is discharged, and the effluent chamber has a second outlet through which water is discharged,
wherein the first baffle has an opening causing the influent chamber and the separator chamber to be in fluid communication with one another, the second baffle has an opening causing the separator chamber and the oil chamber to be in fluid communication one with one another; and
a pipe extending from the separator channel, through the second baffle, the oil removal chamber, and the third baffle, and into the effluent chamber allowing the passage of water from the separator chamber to effluent chamber; and
positioning a plurality of vertical plates into the separator chamber to define a serpentine path from the opening of the first baffle to the opening of the second baffle; and
attaching a lid to top side of the tank so as to create a gas tight seal with the top side of the tank, wherein the lid comprises:
a first top panel having a top side and a bottom side;
a second top panel having a top side and a bottom side, the second top panel connected to the first top panel so that the first top panel and the second top panel are angled relative to one another;
a first end panel positioned at one end of the first top panel and one end of the second top panel; and
a second end panel positioned at an opposite end of the first top panel and an opposite end of the second top panel, wherein the first top panel, the second top panel, the first end panel, and the second end panel cooperate to form a vapor capturing space in fluid communication with the influent chamber, the separator chamber, the oil chamber, and the effluent chamber, and wherein the first end panel has a gas inlet port and the second end panel has a pas outlet port to permit air to flow into the gas inlet port, through the vapor capturing space, and out of the gas outlet port to remove vapors captured in the vapor capturing space.

17. The method of claim 16, wherein the step of positioning the vertical plates comprises positioning the vertical plate into the separation chamber as a unitary assembly.

18. The method of claim 17, further comprising interconnecting one end of a portion of the plates to the first baffle with a hinge plate extending from the first baffle and hingedly connected to the plate and interconnecting an opposing end of another portion of the plates to the second baffle with a hinge plate extending from the second baffle and hingedly connected to the plate to form the serpentine path.

* * * * *

UNITED STATES PATENT AND TRADEMARK OFFICE
CERTIFICATE OF CORRECTION

PATENT NO. : 10,179,300 B2  
APPLICATION NO. : 15/357116  
DATED : January 15, 2019  
INVENTOR(S) : Larry W. Cox, James Redd and Michael Cox Page 1 of 1

It is certified that error appears in the above-identified patent and that said Letters Patent is hereby corrected as shown below:

On the Title Page  
Under References Cited (56): Delete "5,266,119 A" and replace with -- 5,266,191 A --

Signed and Sealed this  
Fifth Day of March, 2019

Andrei Iancu  
*Director of the United States Patent and Trademark Office*